United States Patent
Henzler

(10) Patent No.: US 9,219,411 B2
(45) Date of Patent: Dec. 22, 2015

(54) DC/DC CONVERTER, METHOD FOR PROVIDING AN OUTPUT VOLTAGE ON THE BASIS OF AN INPUT VOLTAGE AND COMPUTER PROGRAM

(75) Inventor: Stephan Henzler, Munich (DE)

(73) Assignee: Intel Deutschland GmbH, Neubiberg (DE)

( * ) Notice: Subject to any disclaimer, the term of this patent is extended or adjusted under 35 U.S.C. 154(b) by 294 days.

(21) Appl. No.: 13/231,482

(22) Filed: Sep. 13, 2011

(65) Prior Publication Data

US 2013/0063100 A1   Mar. 14, 2013

(51) Int. Cl.
G05F 1/00 (2006.01)
H02M 3/156 (2006.01)
H02M 1/00 (2007.01)

(52) U.S. Cl.
CPC ...... *H02M 3/156* (2013.01); *H02M 2001/0032* (2013.01); *Y02B 70/16* (2013.01)

(58) Field of Classification Search
CPC . H02M 3/156; H02M 3/1563; H02M 3/1566; H02M 3/157; H02M 3/158; H02M 2001/0025; H02M 2001/0032; H02M 2001/0035; Y02B 70/16
USPC ......... 323/271–275, 234, 349, 351, 222–226, 323/281–285, 288; 363/21.01, 41, 42, 74, 363/43, 77–82; 375/237–239
See application file for complete search history.

(56) References Cited

U.S. PATENT DOCUMENTS

| | | | |
|---|---|---|---|
| 5,912,552 A | 6/1999 | Tateishi | |
| 6,396,252 B1* | 5/2002 | Culpepper et al. | 323/285 |
| 2006/0273662 A1* | 12/2006 | Hachiya et al. | 307/112 |
| 2008/0030178 A1 | 2/2008 | Leonard et al. | |
| 2009/0040791 A1 | 2/2009 | Qahouq et al. | |
| 2009/0085535 A1 | 4/2009 | Wei | |
| 2009/0128113 A1* | 5/2009 | Ryoo | 323/283 |
| 2009/0200995 A1* | 8/2009 | Tran et al. | 323/222 |
| 2009/0243580 A1 | 10/2009 | Chen | |
| 2010/0201336 A1* | 8/2010 | Chen et al. | 323/285 |
| 2011/0068763 A1* | 3/2011 | Chang et al. | 323/288 |

OTHER PUBLICATIONS

Ramamurthy Srinivasan, Vanaja Ranjan P.: "Pulse Skipping Modulated Buck Converter—Modeling and Simulation" in Circuits and Systems, 2010, 1, p. 59-64.
Chinese Office Action dated Jun. 5, 2014 in connection with CN Patent Application No. 201210337614.X.
Xiao Fei Chen, et al.; "High Efficiency Boost DC/DC Converter with Skip Mode"; Power Supply Technology and Its Application; Department of Electronic Science and Technology, Huazhong University of Sci. and Tech., http://www.cnki.net; 2008, p. 63.

* cited by examiner

*Primary Examiner* — Timothy J Dole
*Assistant Examiner* — Carlos Rivera-Perez
(74) *Attorney, Agent, or Firm* — Eschweiler & Associates, LLC

(57) ABSTRACT

A DC/DC converter includes a switch mode converter for providing an output voltage based on an input voltage and a drive signal generator configured to provide a drive signal for the switch mode converter. The drive signal generator is configured to switch between a non-pulse-skipping mode and a pulse-skipping mode. Moreover, the drive signal generator is configured to adapt a setting of a pulse generation such that a length of a first pulse following a pulse skipping is larger than a minimum length of a pulse in the non-pulse-skipping mode.

22 Claims, 18 Drawing Sheets

DCDC operation with improved pulse skipping mechanism according to invention

DCDC operation with improved pulse skipping mechanism according to invention

DCDC converter with proposed pulse skipping mechanism alternative implementation of proposed pulse skipping mechanism

| STATE-OF-ART | |
|---|---|
| Efficiency @ 1mA load: | 68% |
| Ripple: | 5mV |
| Efficiency @ 10mA load: | 70% |
| Ripple: | 5mV |

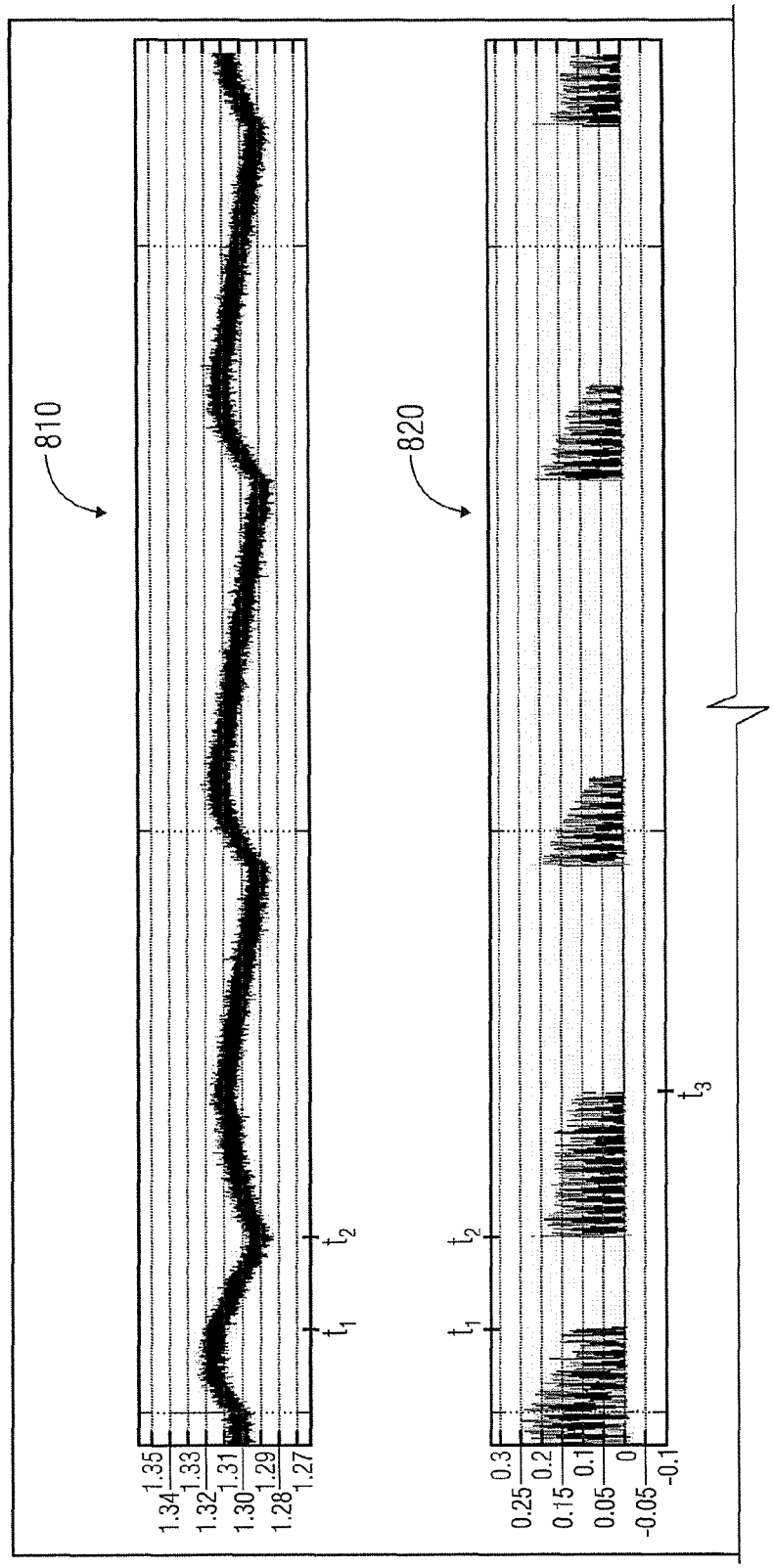

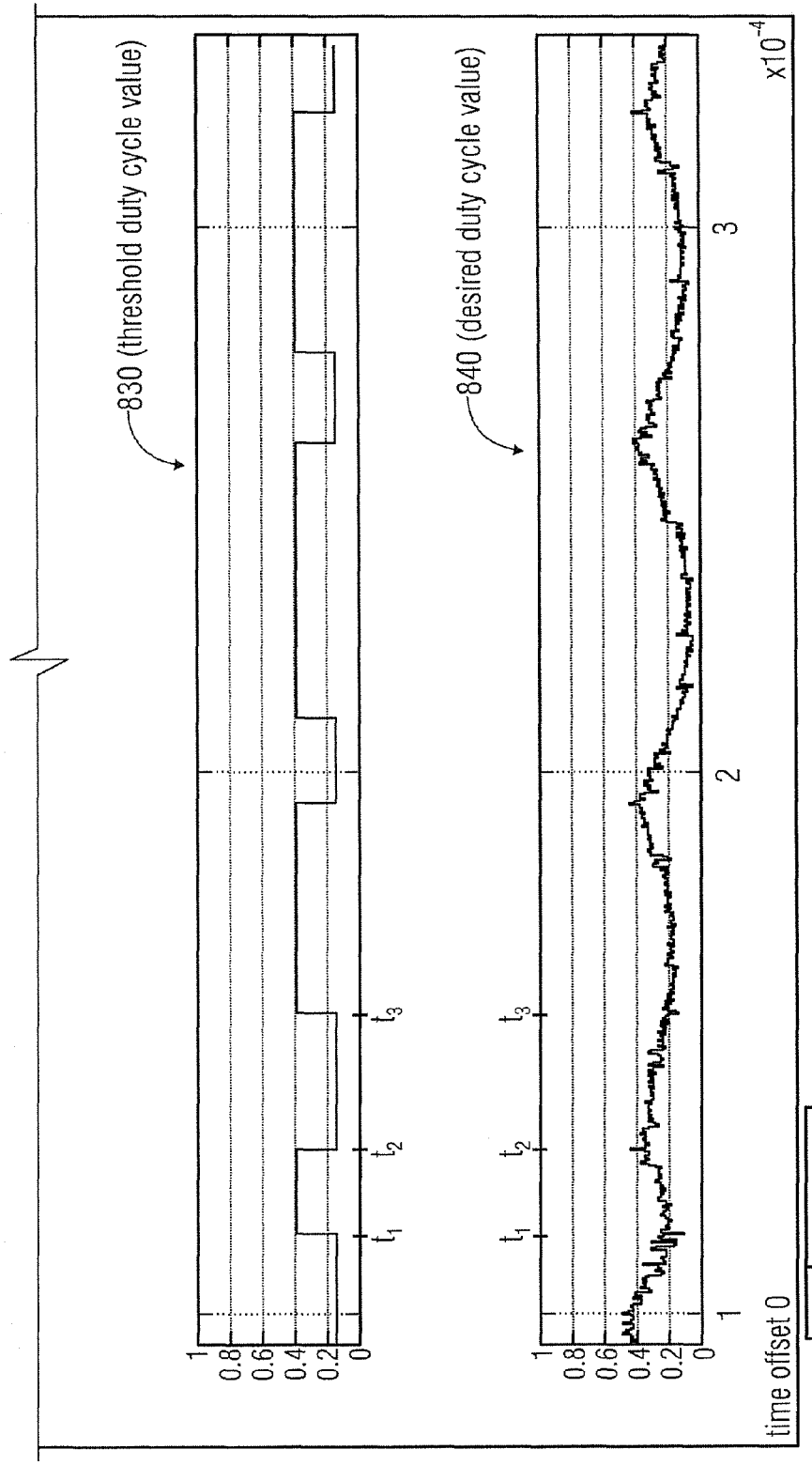
FIG 8A2

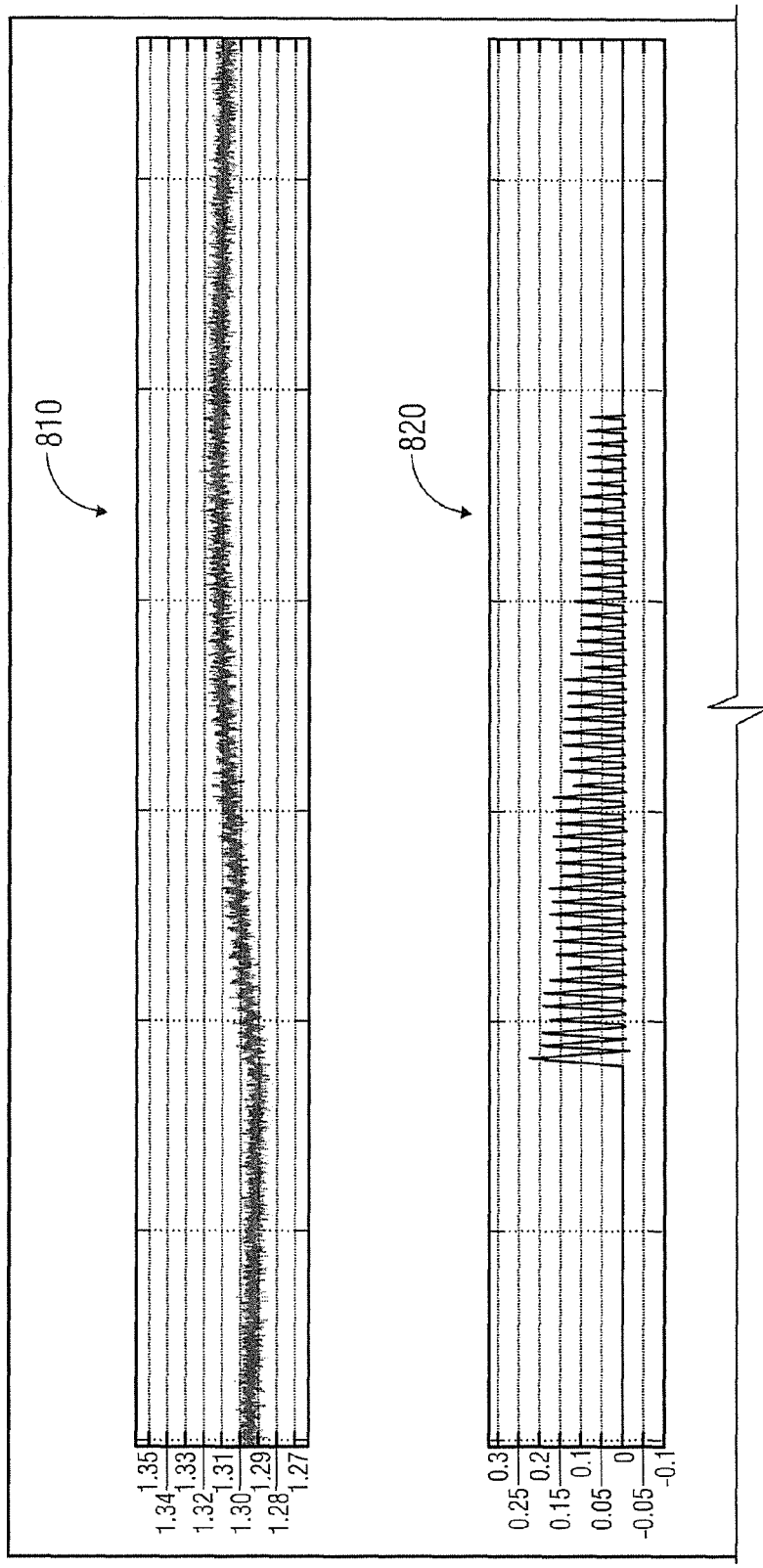
FIG 8B1

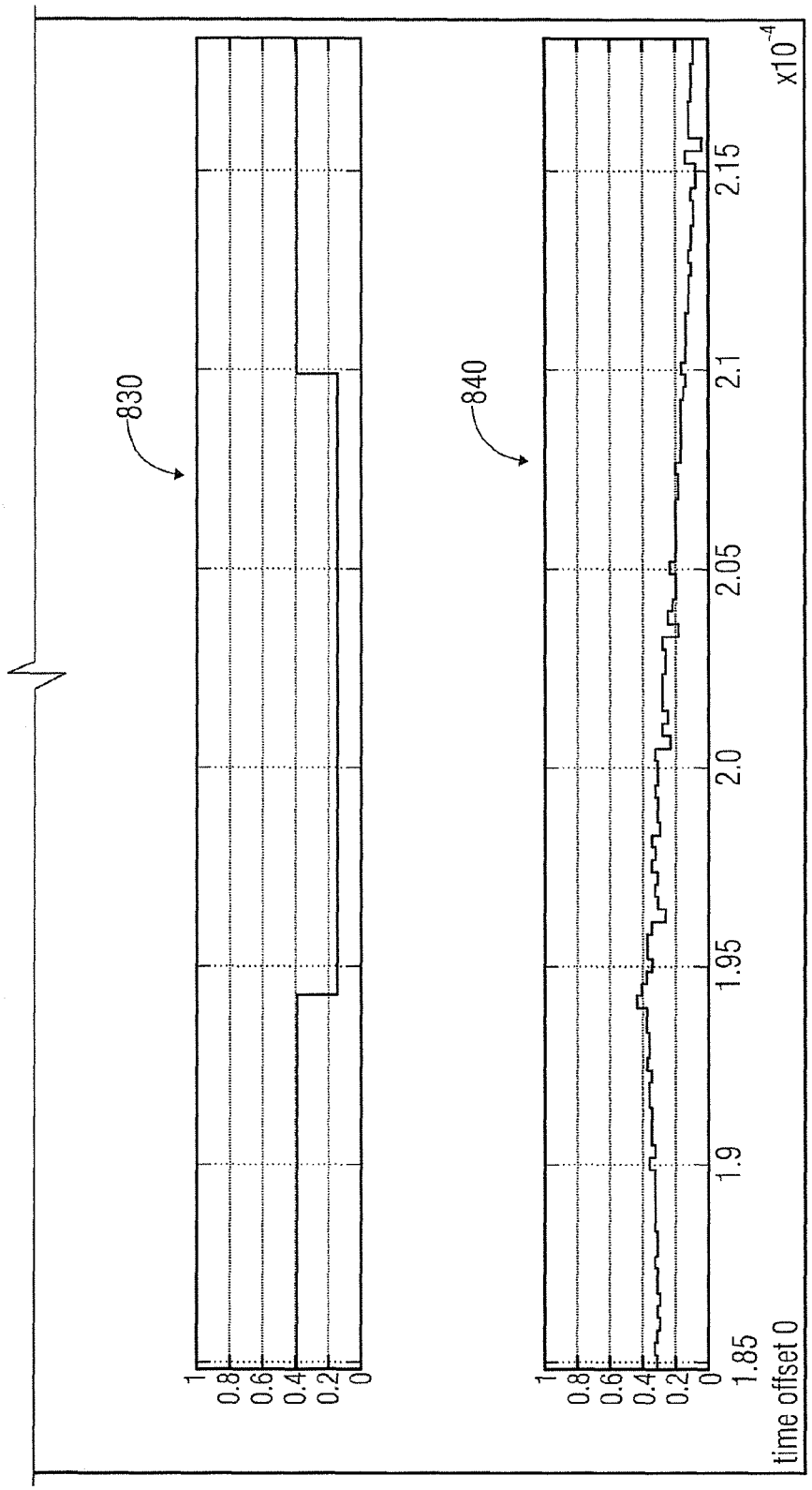

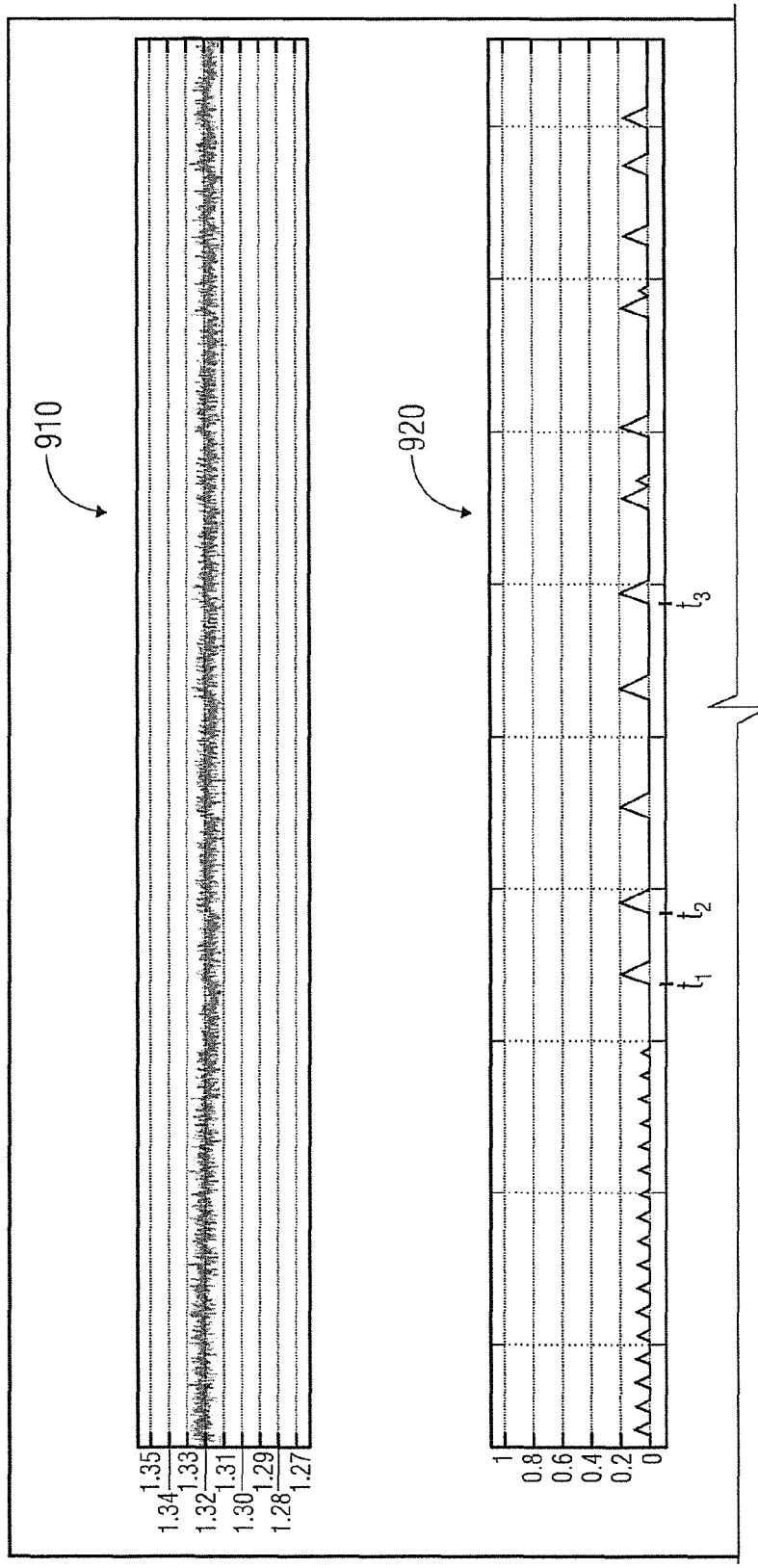

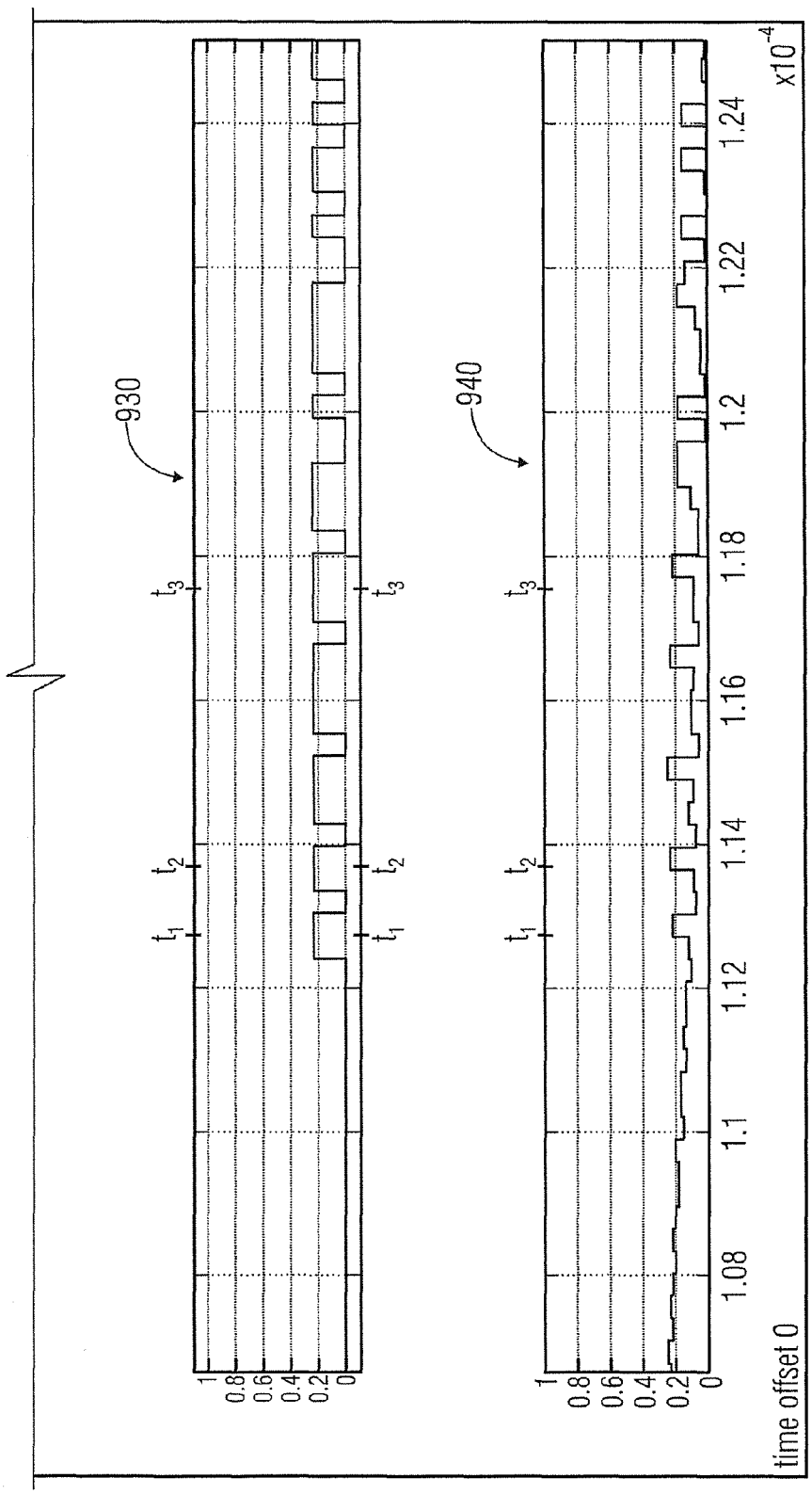

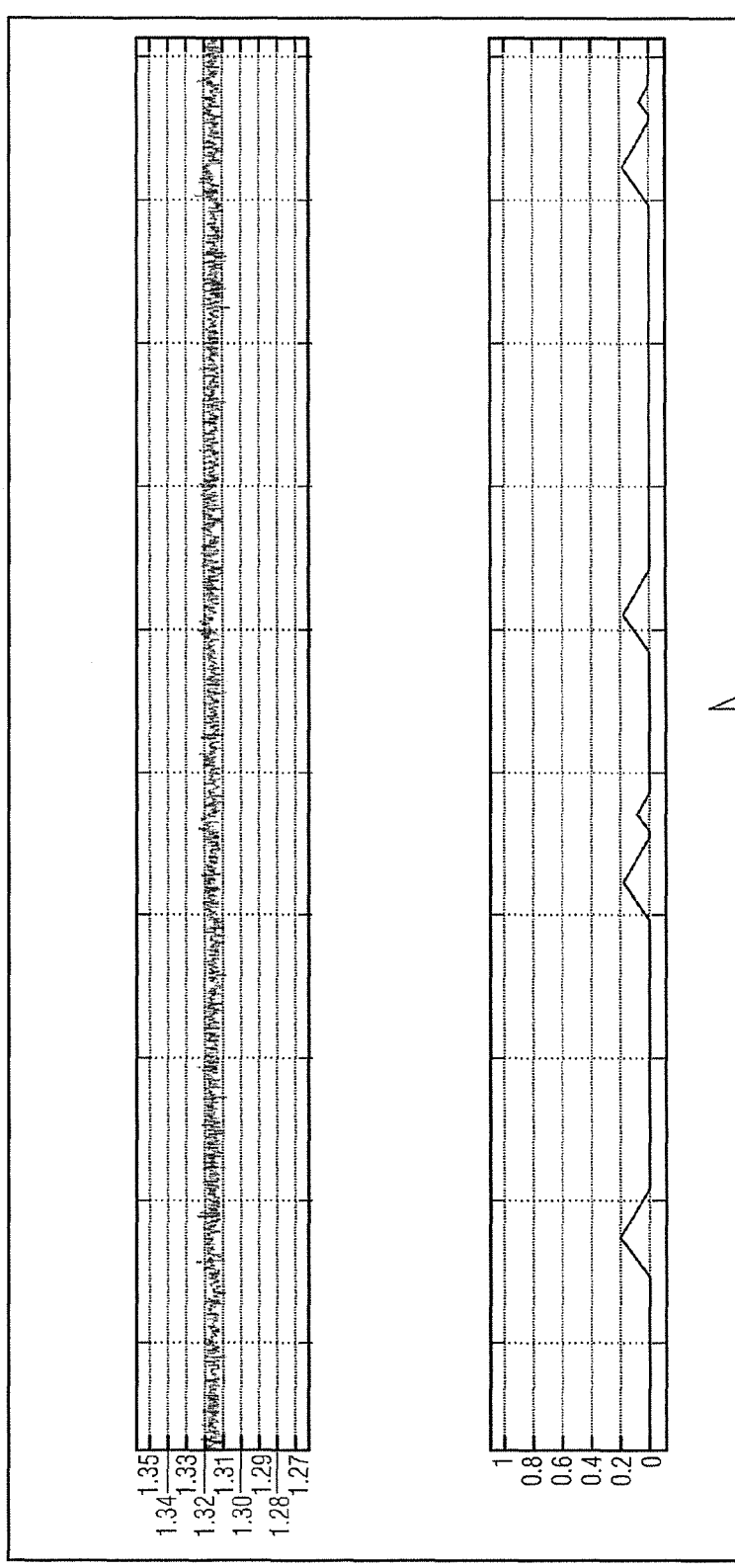

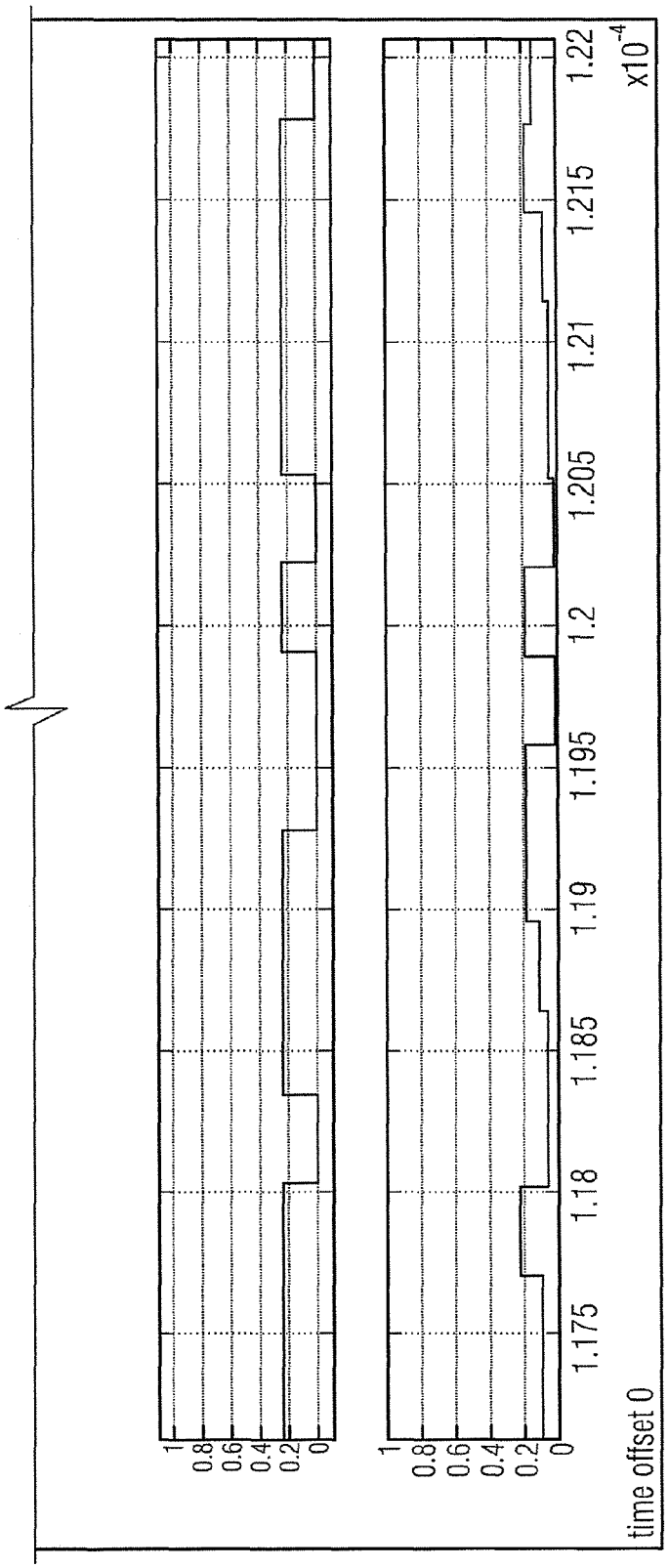
FIG 9B2

Implementation Example 1
% high-pulse skipping

```
if skip_high_pulse_1 == 1
    skip_high_pulse_threshold_1 = OS_factor - min_DC - mspw;
else
    skip_high_pulse_threshold_1 = OS_factor - min_DC + 1;
end
```

FIG 10A

Implementation Example 2
% Single Pulse boosting
```
if skip_high_pulse_1_zm1 == 1
    if DCt_1 >= parameters.PIDpp.single_pulse_boost
        DCt_1 = DCt_1 - parameters.PIDpp.single_pulse_boost;
    end;
end;
```

FIG 10B conventional operation of DCDC converter
with pulse skipping at low load currents DC/DC converter with conventional pulse skipping mechanism

DC/DC CONVERTER, METHOD FOR PROVIDING AN OUTPUT VOLTAGE ON THE BASIS OF AN INPUT VOLTAGE AND COMPUTER PROGRAM

FIELD

Embodiments according to the invention are related to a DC/DC converter. Further embodiments according to the invention are related to a method for providing an output voltage on the basis of an input voltage. Further embodiments according to the invention are related to a computer program.

Some embodiments according to the invention are related to a switching cycle controller for a switched-mode voltage converter.

BACKGROUND

DC/DC converters are used in a very large number of applications. For example, DC/DC converters are used to provide a second DC voltage on the basis of a first DC voltage. For example, DC/DC converters are used where it appears to be more efficient to distribute a single DC voltage from an AC/DC converter across a circuit and to provide different DC voltages locally in the proximity of the consumers. Also, DC/DC converters are often used in battery powered devices to provide the supply voltage for the circuitry on the basis of the battery voltage, which may be different from the supply voltage of the circuitry and which may vary over time.

In many applications it is desirable to be able to adapt a DC/DC converter to strongly varying load conditions. For example, this is necessary if the circuitry supplied by the DC/DC converter can operate both in a high power mode and a low power mode or sleep mode, where the current consumption is close to zero but not equal to zero. Moreover, it has been recognized that the efficiency of a DC/DC converter should be as high as possible in both operating conditions, i.e. under both high load and low load.

SUMMARY

An embodiment according to the invention creates a DC/DC converter comprising a switch mode converter for providing an output voltage on the basis of an input voltage and a drive signal generator configured to provide the drive signal for the switch mode converter. The drive signal generator is configured to switch between a non-pulse-skipping mode and a pulse-skipping mode. The drive signal generator is configured to adapt a setting of a pulse generation such that a length of a first pulse following a pulse skipping is larger than a minimum length of a pulse in the non-pulse-skipping mode.

Another embodiment according to the invention creates a DC/DC converter comprising a means for providing an output voltage on the basis of an input voltage and a means for providing a drive signal for the means for providing the output voltage on the basis of the input voltage. The means for providing the drive signal is configured to switch between a non-pulse-skipping mode and a pulse-skipping mode. The means for providing the drive signal is also configured to adapt a setting of a pulse generation such that a length of a first pulse following a pulse skipping is larger than a minimum length of a pulse in the non-pulse-skipping mode.

An embodiment according to the invention creates a method for providing an output voltage on the basis of an input voltage using a switch mode converter. The method comprises providing a drive signal for the switch mode converter and switching a switch of the switch mode converter based on the drive signal to provide the output voltage on the basis of the input voltage. Providing the drive signal comprises providing the drive signal in a non-pulse-skipping mode and providing the drive signal in a pulse-skipping mode, wherein a switching is performed between the non-pulse-skipping mode and the pulse-skipping mode. Moreover, a setting of a pulse generation is adapted such that a length of a first pulse following a pulse skipping is larger than a minimum length of a pulse in the non-pulse-skipping mode.

Another embodiment according to the invention creates a computer program comprising instruction on a non-transitory median for performing a method for providing a drive signal for a switch mode converter, wherein the method for providing the drive signal comprises providing the drive signal in a non-pulse-skipping mode and providing the drive signal in a pulse-skipping mode, wherein a switching is performed between the non-pulse-skipping mode and the pulse-skipping mode. A setting of a pulse generation is adapted such that a length of a first pulse following a pulse skipping is larger than a minimum length of a pulse in the non-pulse-skipping mode.

BRIEF DESCRIPTION OF THE DRAWINGS

Embodiments according to the invention will subsequently be described taking reference to the enclosed figures, in which:

FIG. 8*a* shows a graphic representation of signals in a DC/DC converter according to FIG. 3;

FIG. 8*b* shows a zoomed representation of the signals of FIG. 8*a*;

FIG. 9*a* shows a graphic representation of signals in a DC/DC converter according to FIG. 4;

FIG. 9*b* shows a zoomed representation of the signals of FIG. 9*a*;

FIG. 10*a* shows a pseudo program code representation of a control concept that can be used in the DC/DC converter according to FIG. 3;

FIG. 10*b* shows a pseudo program code representation of a control concept that can be used in the DC/DC converter according to FIG. 4;

DETAILED DESCRIPTION

Figure 1:
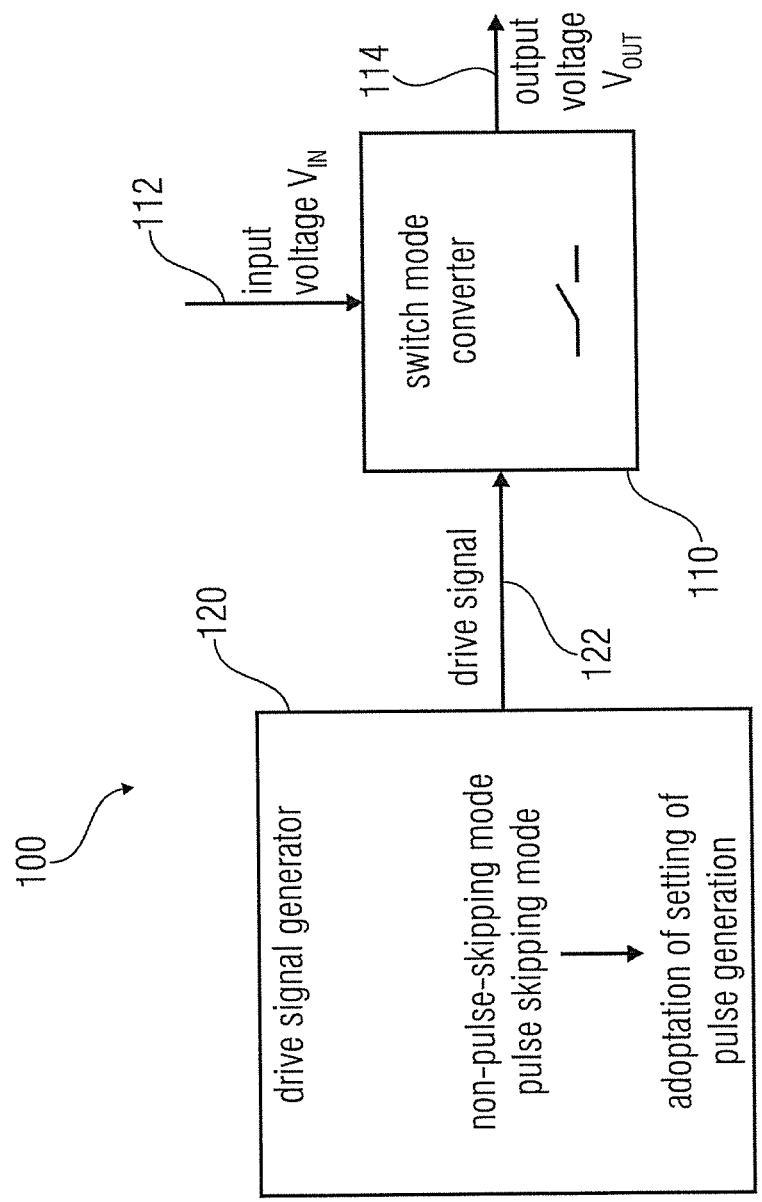
FIG. 1 shows a block schematic diagram of a DC/DC converter, according to an embodiment of the invention.

FIG. 1 shows a block schematic diagram of a DC/DC converter according to an embodiment of the invention. The DC/DC converter 100 according to FIG. 1 comprises a switch mode converter 110 for providing an output voltage 114 on the basis of an input voltage 112. The DC/DC converter 100 also comprises a drive signal generator 120 that is configured to provide a drive signal 122 (also sometimes designated with PWM) for the switch mode converter 110. The drive signal generator 120 is configured to switch between a non-pulse-skipping mode, in which the drive signal is, for example, activated for each switching cycle, and a pulse-skipping mode, in which the drive signal, for example, remains inactive in at least one switching cycle. The drive signal generator 120 is configured to adapt a setting of a pulse generation such that a length of a first pulse following a pulse skipping is larger than a minimum length of a pulse in the non-pulse-skipping mode.

The DC/DC converter brings along the advantage that an efficiency can be increased in the case of small load. By adapting the setting of the pulse generation such that a length of a first pulse following a pulse skipping is larger than a minimum length of a pulse in the non-pulse-skipping mode, the number of pulses generated under very low load conditions can be reduced. By accepting that a first pulse following a pulse skipping is longer than a minimum length of a pulse in the non-pulse-skipping mode, a duration of the pulse-skipping can be extended, which helps to reduce the dynamic losses caused by the activation and deactivation of the switch of the switch mode converter 110. Moreover, a high dynamic range and a fast reaction time can be achieved under medium load conditions by setting the minimum length of a pulse in the non-pulse-skipping mode sufficiently small. Thus, the DC/DC converter 100 brings along both a good reaction to load changes and small losses under low load conditions.

In the following, some optional improvements of the DC/DC converter 100 will be described.

In one embodiment, the DC/DC converter 100 is a synchronous DC/DC converter. In this case, the DC/DC converter comprises a timing generator configured to define a sequence of switching cycles, that may, for example, comprise equal temporal duration. The drive signal generator 120 may, in this case, be configured to provide a pulse of the drive signal 122 for each switching cycle in a non-pulse-skipping mode. Moreover, the drive signal generator may be configured to omit the provision of a pulse of the drive signal in one or more switching cycles in the pulse-skipping mode to thereby perform a pulse-skipping. It has been found that the concept according to the present invention is well suited for application in a synchronous DC/DC converter, and that a high efficiency can be achieved using such a synchronous DC/DC converter. Moreover, it has been found that a synchronous DC/DC converter can be implemented with less effort than a DC/DC converter in which the operating frequency changes. Also, a synchronous DC/DC converter using switching cycles of equal temporal duration generates a well-predictable harmonic spectrum, such that an input filtering and/or output filtering can be well-adapted to thereby reduce interference.

In one embodiment the drive signal generator 120 may optionally be configured to adjust a duty cycle (for example, an actual duty cycle) of the pulses of the drive signal 122 in the non-pulse-skipping mode based on a comparison (like, for example, a difference formation) between the output voltage 114 and a reference voltage, such that the minimum length of a pulse is obeyed (for example, such that a minimum length of a pulse does not lie below a length defined by a threshold duty cycle value). In other words, a range of the duty cycle adjustment (that may, for example, take the form of a duty cycle regulation) is limited in the non-pulse-skipping mode, such that excessively short pulses (having a pulse length below the minimum pulse length) of the drive signal 122 are avoided. It has been found that it is recommendable to limit the minimum length (or, equivalently, the duty cycle) of the pulses of the drive signal 122, because very short pulses of the drive signal 122 would result in a poor efficiency of the DC/DC converter or even malfunction of the switched mode converter.

In one embodiment, the drive signal generator 120 may optionally be configured to obtain (for example, generate by itself, or receive from an external regulation circuit) a desired duty cycle information based on the comparison (like, for example, a difference formation) between the output voltage 114 and the reference voltage both in the pulse-skipping mode and in the non-pulse-skipping mode. In this case, the drive signal generator 120 is configured to compare the desired duty cycle information (that may also be considered as an intended duty cycle information) with a threshold duty cycle information (representing a threshold duty cycle value) and to switch from the non-pulse-skipping mode to the pulse-skipping mode if the desired duty cycle information is smaller than or equal to the threshold duty cycle information. Accordingly, there is a reliable criterion for switching from the non-pulse-skipping mode to the pulse-skipping mode that avoids an undesirably early transition to the pulse-skipping mode.

In one embodiment, the drive signal generator 120 may optionally be configured to selectively omit the provision of a pulse of the drive signal 122 if the desired duty cycle information (that may, for example, be represented by a digital information representation or by an analog signal) is smaller than or equal to the threshold duty cycle value represented by the threshold duty cycle information. Moreover, the drive signal generator 120 may optionally be configured to increase the threshold duty cycle information from a first threshold duty cycle value to a second threshold duty cycle value in response to the omission of the provision of a pulse of the drive signal 122, such that a length of a first pulse following the pulse skipping (that is typically started by the omission of the provision of a pulse of a drive signal and that may last for one or more of the switching cycles) is larger than the minimum length of a pulse in the non-pulse-skipping mode. In other words, there is a hysteresis with respect to the desired duty cycle information when switching between the non-pulse-skipping mode and the pulse-skipping mode, that helps keep the efficiency of the DC/DC converter 100 sufficiently high even under low load conditions. Specifically, a pulse skipping (i.e., the omission of the provision of one or more pulses of the drive signal 122) is initiated if the desired duty cycle information falls below the first duty cycle threshold value, and the provision of pulses of the drive signal is only resumed when the desired duty cycle information reaches or exceeds the second duty cycle threshold value (that is larger than the first duty cycle value). Thus, the high dynamic range and fast reaction time of the non-pulse-skipping mode is maintained until the desired duty cycle information reaches or falls below the first threshold duty cycle value. However, the good power efficiency of the pulse-skipping mode is maintained until the desired duty cycle information reaches or exceeds the second threshold duty cycle value once the pulse-skipping mode is entered (i.e., one or more pulses have been omitted or skipped).

Alternatively the threshold duty cycle information can be gradually increased depending on the number of skipped switching pulses.

In one embodiment, the drive signal generator 120 is optionally configured to resume the provision of one or more pulses of the drive signal after the omission of one or more pulses of the drive signal if the desired duty cycle information is larger than or equal to the threshold duty cycle information (which is set to the second threshold duty cycle value in response to the omission of one or more pulses of the drive signal). In this case, the drive signal generator 120 is configured to again reduce the threshold duty cycle information in response to the resumption of the provision of one or more pulses of the drive signal 122 (i.e., in response to the fact that the desired duty cycle information reaches or exceeds the second threshold duty cycle value). Accordingly, the hysteresis mentioned above is implemented using a simple concept.

In one embodiment, the drive signal generator 120 is configured to reset the threshold duty cycle information to the threshold duty cycle value in response to the resumption of the provision of one or more pulses of the drive signal. Accordingly, a simple switching between two threshold duty cycle values may be used. However, a different adaptation of the threshold duty cycle values (for example, a smooth transition from the second threshold duty cycle value down to the first threshold duty cycle value) may be used.

In one embodiment, the drive signal generator 120 is optionally configured to obtain a desired duty cycle information and switch from the non-pulse-skipping mode to the pulse-skipping mode if the desired duty cycle information is smaller than or equal to a first threshold duty cycle value. The drive signal generator 120 is further configured to switch from the pulse-skipping mode to the non-pulse-skipping mode if the desired duty cycle information is larger than or equal to the second threshold duty cycle value, wherein the first threshold duty cycle value is different from the second threshold duty cycle value (wherein the first threshold duty cycle value typically represents a smaller duty cycle of the pulses of the drive signal than the second threshold duty cycle value). Thus, a hysteresis mechanism for switching between the different modes can be implemented easily.

In one embodiment, the drive signal generator is optionally configured to obtain a desired duty cycle information (for example, on the basis of a comparison between the output voltage 114 and the reference voltage). In this case, the drive signal generator 120 is configured to provide pulses of the drive signal 122 in the non-pulse-skipping if the desired duty cycle information is larger than or equal to a first threshold duty cycle value. Moreover, the drive signal generator 120 is, in this case, configured to enter the pulse skipping mode, in which the provision of one or more pulses of the drive signal is omitted, in response to the desired duty cycle information reaching or falling below the first threshold duty cycle value. Moreover, the signal generator is configured to resume the provision of one or more pulses of the drive signal after the omission of the provision of one or more pulses only when the desired duty cycle information reaches or exceeds a second threshold duty cycle value, wherein the second threshold duty cycle value is larger than the first threshold duty cycle value.

In one embodiment, the drive signal generator 120 is optionally configured to provide the pulses 122 of the drive signal such that a duty cycle of the pulses of the drive signal 122 is determined by the desired duty cycle information, such that a length of a pulse following a pulse skipping is larger than the minimum length of a pulse that is determined by the first threshold duty cycle value. In other words, the provision of a comparatively long pulse after a pulse skipping is achieved with low effort by adjusting the length (or, equivalently, the duty cycle) of the pulses of the drive signal 122 based on the desired duty cycle information and by resuming the provision of one or more pulses of the drive signal 122 after a pulse skipping only when the desired duty cycle information is significantly larger than the first threshold duty cycle value (which, in turn, represents the minimum length or duty cycle of pulses of the drive signal in the non-pulse-skipping mode). Accordingly, the drive signal generator 120 can be designed such that the length (or duty cycle) of the drive signal 122 is in the same fixed dependency from the desired duty cycle information both in the non-pulse-skipping mode and the pulse-skipping mode, which facilitates the design of the drive signal generator. At the same time, the desired duty cycle information can be used to decide whether or not to provide a pulse. Thus, a very simple implementation is possible.

In one embodiment, the drive signal generator 120 is optionally configured to obtain a desired duty cycle information based on the comparison (like, for example, a difference formation) between the output voltage and the reference voltage both in the pulse-skipping mode and the non-pulse-skipping mode. In this case, the drive signal generator 120 is configured to selectively increment the desired duty cycle information in the pulse-skipping mode (i.e., if one or more previous pulses of the drive signal have been skipped, or if a provision of one or more pulses of the drive signal has been omitted), to derive a modified duty cycle information from the desired duty cycle information, such that a duty cycle of a pulse of the drive signal 122 following a pulse skipping is larger than a duty cycle described (for the pulse) by the desired duty cycle information. Thus, another very simple mechanism for the artificial prolongation of a length of a first pulse following a pulse skipping is created. Using this mechanism, a simple switching between the non-pulse-skipping mode and the pulse-skipping mode can be implemented (for example, without any hysteresis) while it is still possible to obtain an improvement of efficiency caused by the prolongation of the first pulse following the pulse skipping. Moreover, it is typically possible with moderate effort to selectively increase the desired duty cycle information, which may be provided in the same manner independent from the mode of operation (non-pulse-skipping mode or pulse-skipping mode). The selective increment of the desired duty cycle information, to derive the modified duty cycle information, can be performed using a digital circuit or an analog circuit, whichever is appropriate in the specific implementation.

In one embodiment, the drive signal generator is optionally configured to disable the increment of the desired duty cycle information in response to a provision of a pulse of the drive signal until a next pulse skipping occurs. Thus, the increment of the desired duty cycle information (to obtain the modified duty cycle information) may be limited to a first pulse following a pulse skipping, which may bring along a particularly good regulation characteristic with comparatively small ripple.

However, in another embodiment, lengths (or duty cycles) of more than one pulse of the drive signal immediately following a pulse skipping may be increased (for example, when compared to a minimum length of a pulse in the non-pulse-skipping mode or when compared to a length described by desired duty cycle information). In other words, the drive signal generator may be configured such the first N pulses (for example, of the drive signal) following a pulse skipping are increased (for example, with respect to their length or duty cycle) (wherein N may be larger than 1). This may, for example, result in increased peak current of current pulses in the switched mode converter.

In one embodiment, the drive signal generator 120 may optionally be configured to compare the desired duty cycle information with a predetermined threshold duty cycle value, to decide whether to provide a pulse of the drive signal 122 or to omit the provision of a pulse of the drive signal 122. In this case, the predetermined threshold duty cycle value may be independent from whether the previous pulse has been skipped or not. Accordingly, a ripple in the pulse skipping mode may be kept reasonably small. However, a total number of pulses may still be reduced when compared to conventional concepts which, in turn, helps improve the efficiency in the low load condition.

In one embodiment, an increment value, by which the desired duty cycle information is selectively incremented in the pulse-skipping mode, may optionally be programmable. Accordingly, the DC/DC converter may be adapted to characteristics of a load connected to an output of the DC/DC converter.

In an embodiment, the drive signal generator may optionally be configured to adjust an increment value, by which the desired duty cycle information is selectively incremented in the pulse-skipping mode, based on a skip rate (for example, defined as a ratio between skipped pulses and totals pulses). Thus, an actual load state can be considered. For example, an excessive overshoot can be avoided by setting the increment value to a comparatively small value in the presence of a small load (that may be recognized by a large ratio between a number of skipped pulses and a number of non-skipped pulses). Alternatively, it is possible to count a number of skipped pulses (for example, a number of immediately subsequent skipped pulses) and to (selectively) increment the desired duty cycle information based on the counted number of skipped pulses.

In an embodiment, the non-pulse-skipping mode may be a continuous conduction mode or a discontinuous conduction mode of the DC/DC converter. Thus, there may be a switching between a continuous conduction mode and the pulse-skipping mode and/or between the discontinuous conduction mode and the pulse-skipping mode.

In one embodiment the modification of the threshold duty cycle is only done if the pulse skipping mode is entered from a discontinuous conduction mode but not from a continuous conduction mode or vice versa.

In one embodiment the duty cycle is only selectively incremented when the pulse skipping mode is entered from a discontinuous conduction mode but not from a continuous conduction mode or vice versa.

In other words, in a preferred embodiment, the DC/DC converter is configured to operate in a continuous conduction mode without pulse skipping, in a discontinuous conduction mode without pulse skipping and in the pulse-skipping mode. In this case, the drive signal generator is configured to selectively omit the provision of a pulse of the drive signal if the desired duty cycle information is smaller than or equal to the threshold duty cycle value represented by the threshold duty cycle information. Also, the drive signal generator is configured to selectively increase the threshold duty cycle information from a first threshold duty cycle value to a second threshold duty cycle value in response to the omission of the provision of a pulse of the drive signal if the DC/DC converter was operating in the continuous conduction mode immediately before the omission of the provision of a pulse of the drive signal. The drive signal generator is further configured to leave the threshold duty cycle information unchanged if the DC/DC converter was operating in the discontinuous conduction mode immediately before the omission of the provision of a pulse of the drive signal, such that a length of a first pulse following the pulse skipping is larger than the minimum length of a pulse in the non-pulse-skipping mode if the DC/DC converter was operating in the continuous conduction mode immediately before the omission of the provision of a pulse of the drive signal.

In another embodiment, the DC/DC converter is configured to operate in a continuous conduction mode without pulse skipping, in a discontinuous conduction mode without pulse skipping and in the pulse-skipping mode. In this embodiment, the drive signal generator is configured to selectively omit the provision of a pulse of the drive signal if the desired duty cycle information is smaller than or equal to the threshold duty cycle value represented by the threshold duty cycle information. Also, the drive signal generator is configured to selectively increase the threshold duty cycle information from a first threshold duty cycle value to a second threshold duty cycle value in response to the omission of the provision of a pulse of the drive signal if the DC/DC converter was operating in the discontinuous conduction mode immediately before the omission of the provision of a pulse of the drive signal. The drive signal generator is further configured to leave the threshold duty cycle information unchanged if the DC/DC converter was operating in the continuous conduction mode immediately before the omission of the provision of a pulse of the drive signal, such that a length of a first pulse following the pulse skipping is larger than the minimum length of a pulse in the non-pulse-skipping mode if the DC/DC converter was operating in the discontinuous conduction mode immediately before the omission of the provision of a pulse of the drive signal.

In another embodiment, the DC/DC converter is configured to operate in a continuous conduction mode without pulse skipping, in a discontinuous conduction mode without pulse skipping and in the pulse-skipping mode. In this embodiment, the drive signal generator is configured to obtain a desired duty cycle information based on a comparison or difference formation between the output voltage and the reference voltage both in the pulse-skipping mode and in the non-pulse-skipping mode. Also, the drive signal generator is configured to selectively increment the desired duty cycle information in response to the omission of the provision of a pulse of the drive signal if the DC/DC converter was operating in the continuous conduction mode immediately before the omission of the provision of a pulse of the drive signal, to derive a modified duty cycle information from the desired duty cycle information, and to omit the increment of the desired duty cycle information if the DC/DC converter was operating in the discontinuous conduction mode immediately before the omission of the provision of a pulse of the drive signal. Consequently a duty cycle of a first pulse of the drive signal following a pulse skipping is larger than a duty cycle described by the desired duty cycle information if the DC/DC converter was operating in the continuous conduction mode immediately before the omission of the provision of a pulse of the drive signal.

In another embodiment, the DC/DC converter is configured to operate in a continuous conduction mode without pulse skipping, in a discontinuous conduction mode without pulse skipping and in the pulse-skipping mode. In this embodiment, the drive signal generator is configured to obtain a desired duty cycle information based on a comparison or difference formation between the output voltage and the reference voltage both in the pulse-skipping mode and in the non-pulse-skipping mode. Also, the drive signal generator is configured to selectively increment the desired duty cycle information in response to the omission of the provision of a pulse of the drive signal if the DC/DC converter was operating in the discontinuous conduction mode immediately before the omission of the provision of a pulse of the drive signal, to derive a modified duty cycle information from the desired duty cycle information, and to omit the increment of the desired duty cycle information if the DC/DC converter was operating in the continuous conduction mode immediately before the omission of the provision of a pulse of the drive signal. Consequently a duty cycle of a first pulse of the drive signal following a pulse skipping is larger than a duty cycle described by the desired duty cycle information if the DC/DC converter was operating in the discontinuous conduction mode immediately before the omission of the provision of a pulse of the drive signal.

In one embodiment, the DC/DC converter optionally comprises a digital control loop. Such a digital control loop allows for a flexible reconfiguration of the pulse generation and is well suited for the implementation of the concept described herein.

In the following, a DC/DC operation with an improved pulse skipping mechanism according to the invention will be described in reference to FIG. 2. It should be noted that the DC/DC operation according to FIG. 2 may be applied in the DC/DC converter 100 according to FIG. 1 or in the DC/DC converter according to FIG. 3.

Figure 2:
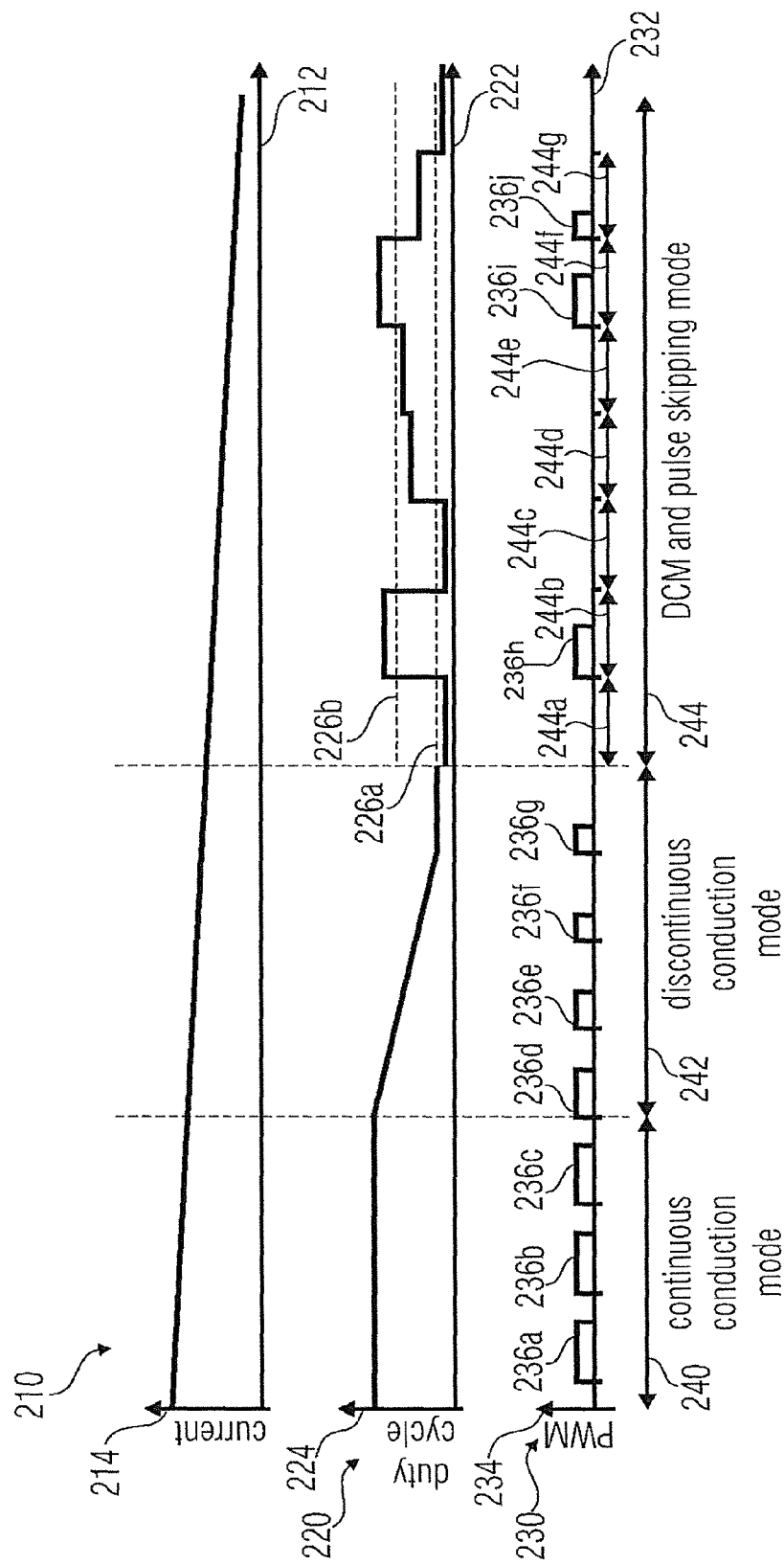
FIG. 2 shows a schematic representation of a DC/DC operation with an improved pulse skipping mechanism according to an embodiment of the invention.

FIG. 2 shows a schematic representation of the DC/DC operation with an improved skipping mechanism. The first graphical representation 210 shows a temporal evolution of the current over time, wherein an abscissa 212 describes the time and an ordinate 214 describes the load current (for example, the current flowing through a load connected to an output of the switch mode converter). A second graphical representation 220 describes a temporal evolution of a desired duty cycle information, wherein an abscissa 222 describes the time and wherein an ordinate 224 describes a magnitude of the desired duty cycle (for example, a duty cycle provided by a controller or regulator receiving the output voltage and a reference voltage and providing the desired duty cycle information as an actuating variable based on a comparison, like, for example, a difference formation between the output voltage and the reference voltage). The third graphical representation 230 describes pulses of the drive signal, wherein an abscissa 232 describes the time and wherein an ordinate 234 describes the state of the drive signal.

As can be seen in FIG. 2, it is assumed that the load current, which is shown in the first graphical representation 210, decreases over time. As the load current is comparatively large during a first time interval 240, the DC/DC converter operates in the continuous conduction mode in the first time interval 240. Thus, the desired duty cycle information takes a comparatively large value or a maximum value during the first time interval 240. Moreover, a sequence of pulses 236a, 236b, 236c are provided during the first time interval 240, wherein a duty cycle of the pulses 236a, 236b, 236c takes a comparatively large value or even a maximum value. However, it should be noted that in steady state the pulses 236a, 236b, 236c naturally do not comprise a duty cycle of 100%, as the operation of the switch mode converter naturally requires some off-time of the drive signal as well.

During a second time interval 242, the DC/DC converter operates in a discontinuous conduction mode because the load current continues to decrease. As a result of the decrease of the load current, the desired duty cycle information reduces to thereby describe a decreasing desired duty cycle. For example, the output voltage of the switch mode converter may increase as a consequence of decreasing load current, such that the desired duty cycle information decreases. As a consequence, a duty cycle (or, equivalently, an on time) of the pulses of the drive signal decreases. For example, a sequence of pulses 236d, 236e, 236f, 236g, is provided, wherein the duty cycle decreases over time. However, it should be noted that the rising edges of the pulses 236a to 236g are preferably, but not necessarily, equidistant in time, because it is assumed that the DC/DC converter is a synchronous DC/DC converter. In other words, there are regular switching cycles.

However, during a third time interval 244 the DC/DC converter is operated in a discontinuous conduction mode and pulse-skipping mode. It is assumed that the current further decreases during the third time interval 244, as can be seen in the first representation 210. As can be seen, the desired duty cycle falls below a first threshold duty cycle value 226a in (or shortly before) the first switching cycle 244a of the third time interval 244. The DC/DC converter recognizes that the desired duty cycle information has fallen below the first threshold duty cycle value 226a and consequently omits the provision of a pulse of the drive signal in the first switching cycle 244a. Thus, a so called "pulse skipping" (i.e., the omission of the provision of a pulse of the drive signal) is performed in the first switching cycle 244a. Also, the threshold duty cycle information is increased from the first threshold duty cycle value 226a to the second threshold duty cycle value 226b in response to the omission of the provision of a pulse (or, equivalently, in response to the finding that the desired duty cycle information is smaller than the first threshold duty cycle value 226a in the switching cycle 244a).

However, as the output voltage of the switch mode converter decreases significantly during the switching cycle 244a, the desired duty cycle information for the switching cycle 244b (which follows the switching cycle 244a) exceeds the second threshold duty cycle value 226b. Even though a stepwise evolution of the desired duty cycle information is shown during the third time interval 244 in FIG. 2, it should be noted that a continuous evolution of said desired duty cycle information is naturally also possible. However, in some embodiments a temporal sampling or time discrete processing is performed. However, in response to finding that the desired duty cycle information is larger than (and/or equal to) the second threshold duty cycle value 226b, the drive signal generator provides a pulse of the drive signal in the switching cycle 244b. Also, the drive signal generator resets the threshold duty cycle information to take the first threshold duty cycle value 226a again. Moreover, it should be noted that the pulse 236h, which is the first pulse following the pulse skipping (which occurs in the switching cycle 244a) comprises a length (or, equivalently, a duty cycle) that is larger than a length (or, equivalently, a duty cycle) of the minimum length pulse 236g in the non-pulse-skipping mode because the length (or duty cycle) of the pulse 236h is determined by the desired duty cycle information of the switching cycle 244b, which in turn is necessarily larger than or equal to the second threshold duty cycle value 226b. In other words, the adaptation of the threshold duty cycle information in response to the pulse skipping brings along the result that the first pulse 236h following the pulse skipping is longer (or equivalently, comprises a larger duty cycle) than the minimum length pulse 236g of the non-pulse-skipping mode (wherein the length or duty cycle of the minimum length pulse 236g is determined by the minimum desired duty cycle information of the non-pulse-skipping mode, which is equal to the first threshold duty cycle value).

Due to the provision of a comparatively long pulse 236h of the drive signal in the switching cycle 244b, the desired duty cycle information is again smaller than the first threshold duty cycle value 226a (to which the threshold duty cycle information is set in response to the provision of the pulse 236h), in (or shortly before) the switching cycle 244c, such that a pulse skipping is performed during the switching cycle 244c. Accordingly, the drive signal generator again increases the threshold duty cycle information to take the second threshold duty cycle value 226b until the next pulse of the drive signal is provided. As can be seen in FIG. 2, it is assumed that the desired duty cycle information remains below the second threshold duty cycle value 226b during the switching cycles 244d and 244e, such that a pulse skipping is performed in the switching cycles 244d and 244e. Only in (or shortly before) the switching cycle 244f, the desired duty cycle information again exceeds the second threshold duty cycle value 226b such that, as a consequence, another pulse 236i of the drive signal is provided. Again, the length (or duty cycle) of the pulse 236i is determined by the desired duty cycle value associated with the switching cycle 244f which is, necessarily, larger than the second threshold duty cycle value 226b. Consequently, the length (or duty cycle) of the pulse 236i is longer (or larger than) the length (or duty cycle) of the minimum length pulse 236g. In response to the provision of the pulse 236i (or, alternatively, in response to the detection that the desired duty cycle information exceeds the second threshold duty cycle value 226b), the drive signal generator again resets the threshold duty cycle information to the first threshold duty cycle value 226a.

It is assumed that the desired duty cycle information associated with the subsequent switching cycle 244g is larger than the first threshold duty cycle value 226a, such that another pulse 236j is provided in the switching cycle 244g. Accordingly, the drive signal generator does not change the threshold duty cycle value in the switching cycle 244g.

To conclude, the DC/DC operation as described with reference to FIG. 2 ensures that a length (or, equivalently, a duty cycle) of a pulse of a drive signal provided following a pulse skipping is longer than a length (or, equivalently, a duty cycle) of a minimum length pulse 236g of the non-pulse-skipping mode. In the example of FIG. 2, this is achieved by increasing the threshold duty cycle value in response to a pulse skipping condition from a first threshold duty cycle value 226a (which defines the entering of the pulse-skipping mode, or simply the skipping of a pulse of the drive signal) to a second threshold duty cycle value 226b (which defines the end of the pulse-skipping mode, or the provision of another pulse). Moreover, different approaches are possible for ensuring that a length of a first pulse following a pulse skipping is larger than a minimum length of a pulse in the non-pulse-skipping mode, as will be discussed below.

In the following, further embodiments of DC/DC converters according to the present invention will be described.

Figure 3:
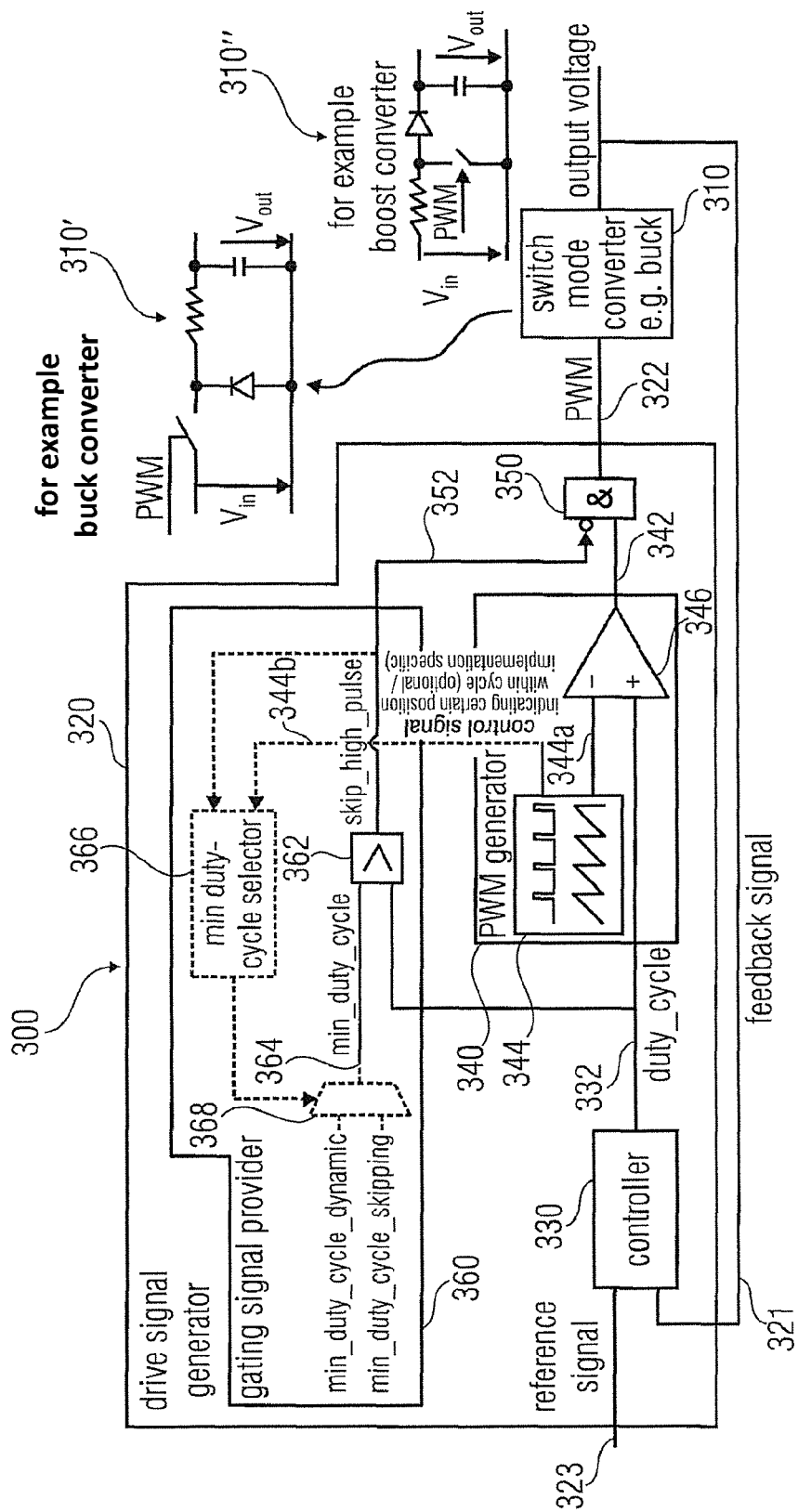
FIG. 3 shows a block schematic diagram of a DC/DC converter using the proposed pulse skipping mechanism, according to an embodiment of the invention.

FIG. 3 shows a block schematic diagram of a DC/DC converter with the proposed pulse skipping mechanism, according to an embodiment of the invention. The DC/DC converter 300 comprises a switch mode converter 310, which may, for example, be a so-called "buck converter" or a so-called "boost converter". The DC/DC converter 300 also comprises a drive signal generator 320, which is configured to receive a feedback signal 321, that may, for example, describe an output voltage of the switch mode converter 310, and provide, on the basis thereof, a drive signal 322 to the switch mode converter 310. The drive signal 322 may, for example, be a pulse width modulation signal, and may serve to control a controlled switch of the switch mode converter, like, for example, a series switch of the buck converter shown at reference numeral 310' or a shunt switch of the boost converter shown at reference numeral 310". The drive signal generator 320 may, optionally, also receive a reference signal 323 or may alternatively provide by itself the reference signal 323. The drive signal generator 320 comprises a controller (or regulator) 330, that is configured to receive the feedback signal 321 and the reference signal 323 and provide, on the basis thereof, a desired duty cycle information 332 that represents a desired duty cycle. For example, the controller (or regulator) 330, which is typically part of a closed control loop, may be configured to control (or provide or regulate) the duty cycle information 332 in order to bring the output voltage of the switch mode converter towards a desired value described by the reference signal 323 or at least into an acceptable interval.

The drive signal generator 320 also comprises a pulse width modulation generator 340 that is configured to receive the desired duty cycle information 332 and to provide, on the basis thereof, a pulse width modulated signal 342. The pulse width modulation generator 340 is configured to provide the pulse width modulated signal 342 such that a duty cycle of the pulse width modulated signal 342 is determined by the desired duty cycle information 332.

In one embodiment, the pulse width modulating generator 340 provides the pulse width modulating signal 342 such that a frequency of the pulse width modulated signal 342 remains constant. For example, the pulse width modulation generator 340 comprises an analog or digital ramp generator or sawtooth generator, that provides an analog or digital sawtooth signal 344a and that may also, optionally, provide a control signal 344b, that may serve for timing synchronization and that may, for example, indicate a certain position within a cycle. It should be noted that the control signal 344 should be considered as being optional and implementation specific. The pulse width modulation generator 340 may also comprise an analog or digital comparator 346, that receives the sawtooth signal 344a and the desired duty cycle information 332 and provides the pulse width modulated signal 342 such that the pulse width modulated signal 342 describes an instantaneous (or quasi-instantaneous, discrete time) comparison result between the desired duty cycle information 332 and the sawtooth signal 344a. Accordingly, the pulse width modulated signal 342 may take a first state as long as the sawtooth signal 344a is smaller than the value of the desired duty cycle information, and such that the pulse width modulated signal 342 takes a second state as long as the sawtooth signal 344a is larger than the value of the desired duty cycle information 332. Accordingly, the pulse width modulated signal 342 may comprise a duty cycle that is determined by the desired duty cycle information 332.

The drive signal generator 320 also comprises a gate 350, that is configured to receive the pulse width modulated signal 342 and a gating signal 352. The gate 350 may be configured such that the pulse width modulated signal 342 is only forwarded to obtain the drive signal 322 if the gating signal 352 is inactive. In other words, if the gating signal 352 is active, the drive signal 322 may be forced into the inactive state, such that, for example, the switch of the switch mode converter is brought into the inactive (non-conducting) state. Thus, an active state of the gating signal 352 may indicate a pulse skipping condition.

Moreover, the drive signal generator 320 also comprises a gating signal provider 360 that is configured to provide the gating signal 352 based on the desired duty cycle information 332. The gating signal provider 360 is configured to activate the gating signal 352 (to achieve a pulse skipping) if the desired duty cycle information (or, more precisely, a value represented by the desired duty cycle information 332) is smaller than (or equal to) a threshold duty cycle information (or, more precisely, a threshold duty cycle value represented by the threshold duty cycle information). Thus, the provision of a pulse of the drive signal 322 is effectively skipped if the value represented by the desired duty cycle information 332 is smaller than (or equal to, in some implementations) a current threshold duty cycle value. However, the current threshold duty cycle value may be time variant and may be increased in the pulse-skipping mode, i.e., if a previous pulse has been skipped. For example, the gating signal provider 360 may comprise a comparator 362, that receives the desired duty cycle information 332 and a threshold duty cycle information 364. The threshold duty cycle information 364 may describe a minimum value of the desired duty cycle information 332 for which a pulse of the drive signal 322 is generated. In other words, the comparator 362 may provide, as an output signal, the gating signal 352, wherein the comparator 362 may provide the gating signal 352 such that the gating signal is active (to cause a pulse skipping) if the desired duty cycle information 332 is smaller than (or equal to) the threshold duty cycle information 364, which is also designated as minimum duty cycle information or "min_duty_cycle". The gating signal provider 360 also comprises selection logic to select the threshold duty cycle value 364. The selection logic 366, 368 may be configured to selectively provide a first threshold duty cycle value ("min_duty_cycle_dynamic") or a second threshold duty cycle value ("min_duty_cycle_skipping") as the threshold duty cycle value to the input of the comparator 362. For example, the first threshold duty cycle value may be provided to the input of the comparator 362 if the last pulse has been provided (i.e., has not been skipped). Otherwise, i.e., if the last pulse has been skipped (which is signaled by the fact that the gating signal 352 has been active for the last pulse), the second threshold duty cycle value may be provided to the input of the comparator 360. The second threshold duty cycle value may describe (or be associated with) a larger duty cycle of the signal 342 than the first threshold duty cycle value. Moreover, it should be noted that the gating signal provider 360 may operate in a synchronous (clocked) manner, such that the provision of the gating signal 352 for the following pulse is performed on the basis of the gating signal associated with a current pulse and the desired duty cycle information 332 associated with the following pulse. An appropriate timing may be ensured by the usage of the control signal 344b, that may used to coordinate the timing of the gating signal provider 360 with a timing of the pulse width modulation generator 340.

To summarize, the threshold duty cycle value, with which the desired duty cycle information 332 is compared to decide whether a next pulse is to be skipped or not, may be changed depending on whether the current pulse (or previous pulse) has been skipped or not. If the current pulse (i.e., the pulse preceding the next pulse) has been skipped, the threshold duty cycle information may be increased for the decision as to whether the next pulse is to be skipped or not. Accordingly, the threshold, which must be reached or exceeded by the desired duty cycle information such that the next pulse is provided (i.e., not skipped) is increased if the current pulse (i.e., the pulse preceding the next pulse) has been skipped (increased when compared to the value if the current pulse had not been skipped). Moreover, as the duty cycle of the next pulse is directly determined by the desired duty cycle information (without any modification in dependence on the skipping or non-skipping of the current pulse), a length (or duty cycle) of a pulse of the drive signal 322 following a pulse skipping is larger than a minimum length (or duty cycle) of a pulse in the non-pulse-skipping mode. Consequently, the efficiency of the DC/DC converter is increased in the pulse skipping mode.

Figure 4:
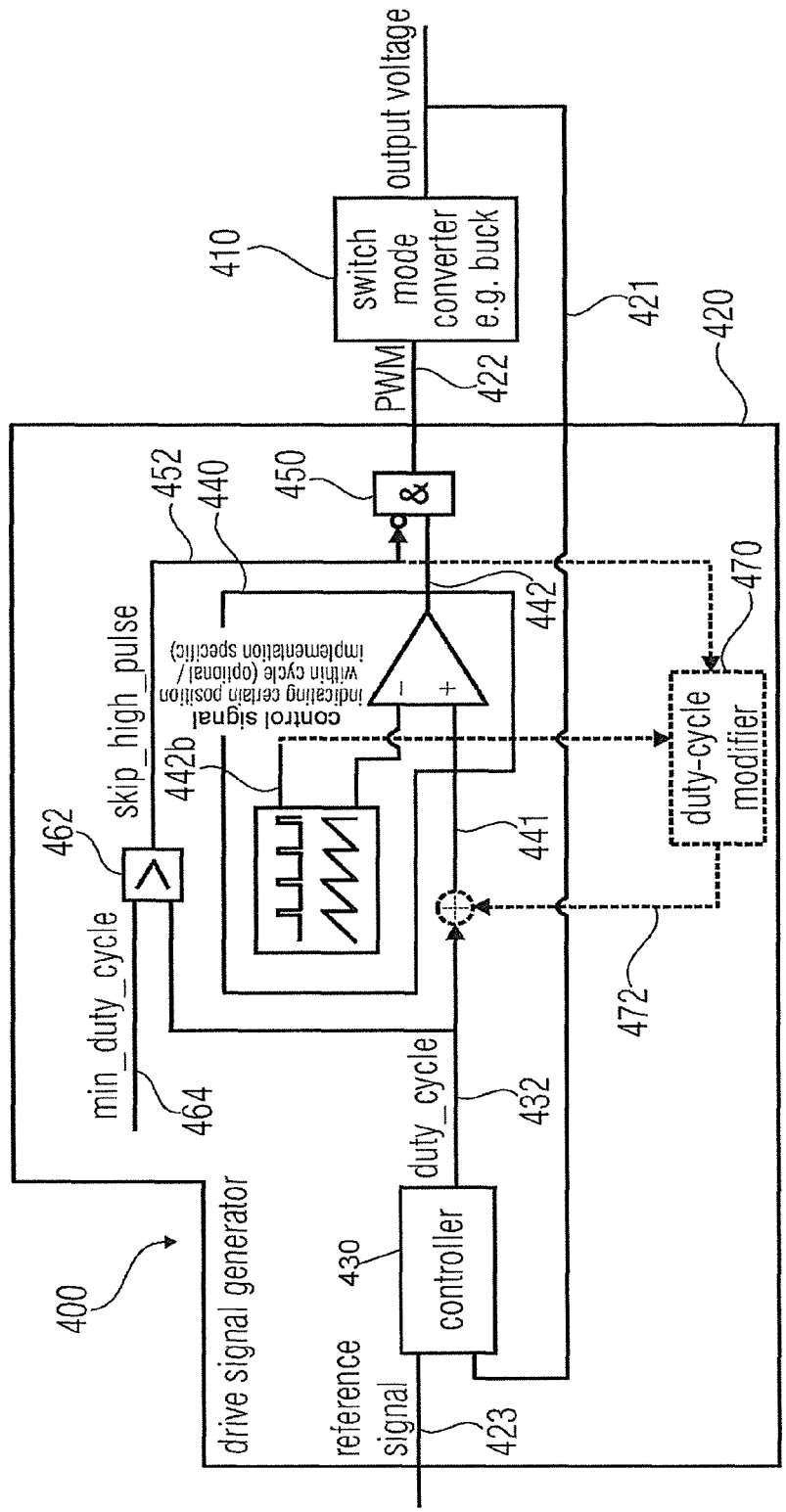
FIG. 4 shows a block schematic diagram of an alternative implementation of a DC/DC converter using the proposed pulse skipping mechanism, according to an embodiment of the invention.

It should be noted that the embodiment according to FIG. 3 may be supplemented by any of the features and functionalities described herein with respect to the embodiments of FIGS. 1, 2 and 4.

In the following, an alternative implementation according to another embodiment of the invention will be described.

FIG. 4 shows a block schematic diagram of a DC/DC converter using such an alternative implementation of the proposed pulse skipping mechanism according to an embodiment of the invention. The DC/DC converter 400 according to FIG. 4 comprises a switch mode converter 410, that may be equivalent to the switch mode converter 310. Accordingly, the switch mode converter 410 receives a drive signal 422 and provides an output voltage based on an input voltage.

The DC/DC converter 400 also comprises a drive signal generator 420, the functionality of which is similar to the functionality of the drive signal generator 320. However, the inner structure of the drive signal generator 420 is different from the inner structure of the drive signal generator 320, as will be described in the following. The drive signal generator 420 receives a feedback signal 421, that may be equivalent to the feedback signal 321 and receives or generates a reference signal 423, that may be equivalent to the reference signal 323. The drive signal generator 420 provides the drive signal 422 for the switch mode converter 410.

The drive signal generator 420 comprises a controller or regulator 430, that receives the feedback signal 421 and the reference signal 423 and provides a desired duty cycle information 432. The controller or regulator 430 may be equivalent to the controller 330, and the desired duty cycle information 432 may be equivalent to the desired duty cycle information 332.

Moreover, the drive signal generator 420 also comprises a pulse width modulation generator 440, the functionality of which is substantially identical to the functionality of the pulse width modulation generator 340. However, the pulse width modulation generator 440 receives, as an input quantity, a modified duty cycle information 441 (rather than the desired duty cycle information), and provides, on the basis thereof, a pulse width modulated signal 442, that is similar to the pulse width modulated signal 342. Thus, a duty cycle of the pulse width modulated signal 442 is determined by the modified duty cycle information 441.

Moreover, the drive signal generator 420 comprises a gate 450, that receives the pulse width modulated signal 442 and a gating signal 452 and provides the drive signal 422. The functionality of the gate 450 is substantially identical to the functionality of the gate 350. Accordingly, a provision of pulses of the drive signal 422 is omitted if the gating signal 452 is active.

However, it should be noted that the generation of the gating signal 452 in the drive signal generator 420 is different from the generation of the gating signal 352 in the drive signal generator 320. The drive signal generator 420 comprises a comparator 462 that receives the desired duty cycle information 432 and compares the desired duty cycle information with a threshold duty cycle information 464 to obtain, as a result of the comparison, the gating signal 452. In one embodiment, the gating signal is activated if the desired duty cycle represented by the desired duty cycle information 432 is smaller than (or equal to) the threshold duty cycle value represented by the threshold duty cycle information 464. Otherwise, if the desired duty cycle value represented by the desired duty cycle information 432 is larger than (or equal to)

the threshold duty cycle value represented by the threshold duty cycle information 464, the gating signal 452 is deactivated, such that the provision of pulses of the drive signal 422 is enabled. Thus, the threshold for a decision as to whether a following pulse (also designated as next pulse) of the gate signal 422 is skipped or not remains unaffected from whether the current pulse of the drive signal 422 has been skipped or not.

However, the drive signal generator 420 also comprises a duty cycle modifier 470, that is configured to receive the gating signal 452 and, optionally, a control signal 442b, wherein the control signal indicates a certain position within a cycle may be considered optional or implementation specific.

The duty cycle modifier 470 also provides a duty cycle modification value 472, which is added to the desired duty cycle information 432, in order to derive the modified duty cycle information 441 from the desired duty cycle information 432. For example, the duty cycle modifier 470 may be configured to provide the duty cycle modification information 472 such that the modified duty cycle information 441 is selectively incremented when compared to the desired duty cycle information 432 if a previous pulse has been skipped, i.e., if the gating signal 452 has been activated for the previous pulse. However, the duty cycle modifier 470 may be configured to provide the duty cycle modification information 472 such that the modified duty cycle information 441 is equal to the desired duty cycle information 432 if the previous pulse has not been skipped, i.e., if the gating signal 452 has been inactive for the previous pulse. Thus, the duty cycle modifier 470 effectively ensures that the modified duty cycle information 441 is selectively increased, when compared to the desired duty cycle information 432, if the previous pulse of the drive signal 422 has been skipped. Accordingly, it is achieved that the length (or, equivalently, a duty cycle) of a first pulse following a pulse skipping is increased over a length (or, equivalently, a duty cycle) described by the desired duty cycle information 432.

It should be noted that the embodiment according to FIG. 4 may be supplemented by any of the features and functionalities described herein with respect to the embodiments of FIGS. 1, 2 and 3.

In the following, some more details will be described and measurement results will be presented and discussed.

FIG. 3 shows a DC/DC converter according to the invention wherein the minimum duty cycle is chosen by a minimum duty cycle select block 366, 368 based on previous pulse skipping decisions, e.g., a (comparatively) high minimum duty cycle (also designated as the second threshold duty cycle value) is chosen if one (or more) previous pulses have been skipped. A (comparatively) small minimum duty cycle (also designated as the first threshold duty cycle value) is chosen if the previous pulse has not been skipped.

FIG. 4 shows an alternative implementation where the threshold for the pulse skipping decision is fixed. If one or more pulses have been skipped, however, the next pulse that is not skipped is artificially increased. This leads to the same result that a not-skipped pulse (e.g., a not-skipped pulse following a pulse skipping) is larger than usual, i.e., transfers more charge to the output capacitor (cap) and so leads to less pulses at the switching node (for example at the switch of the buck converter or at the switch of the boost converter, or at the switches of a buck-boost converter or any other switched mode converter).

Figure 5:
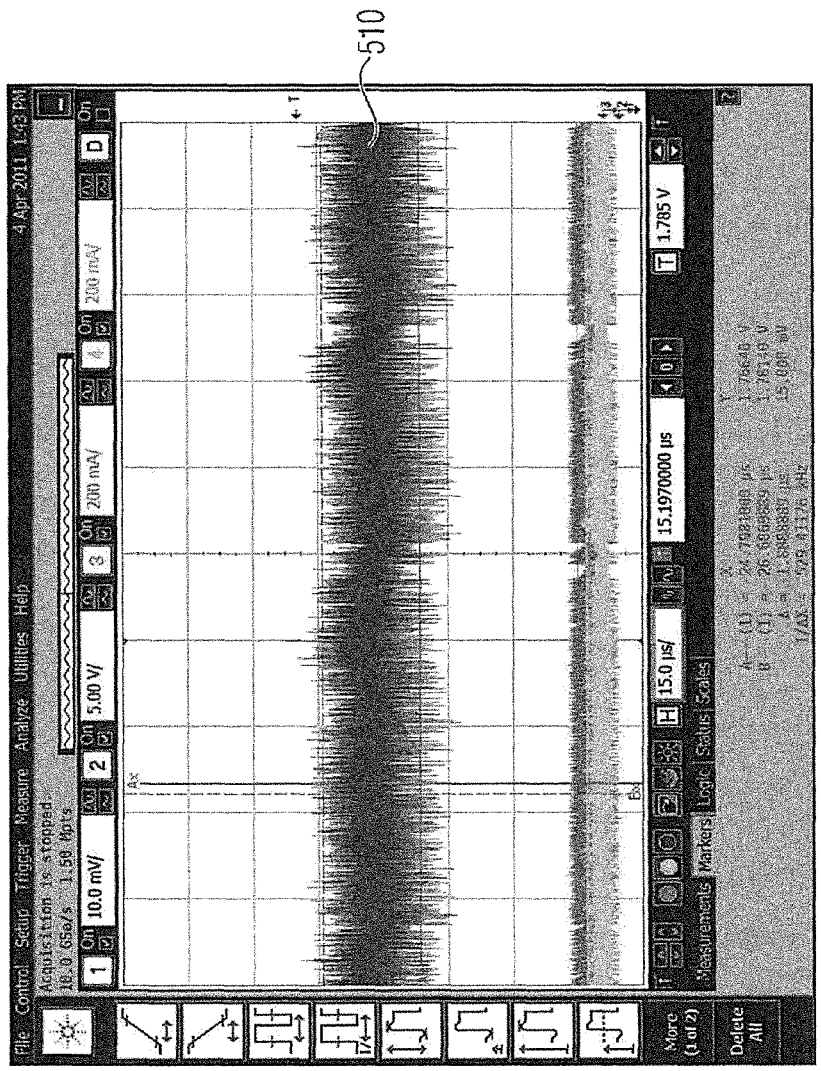
FIG. 5 shows a graphic representation of signals in a conventional DC/DC converter.
Figure 6:
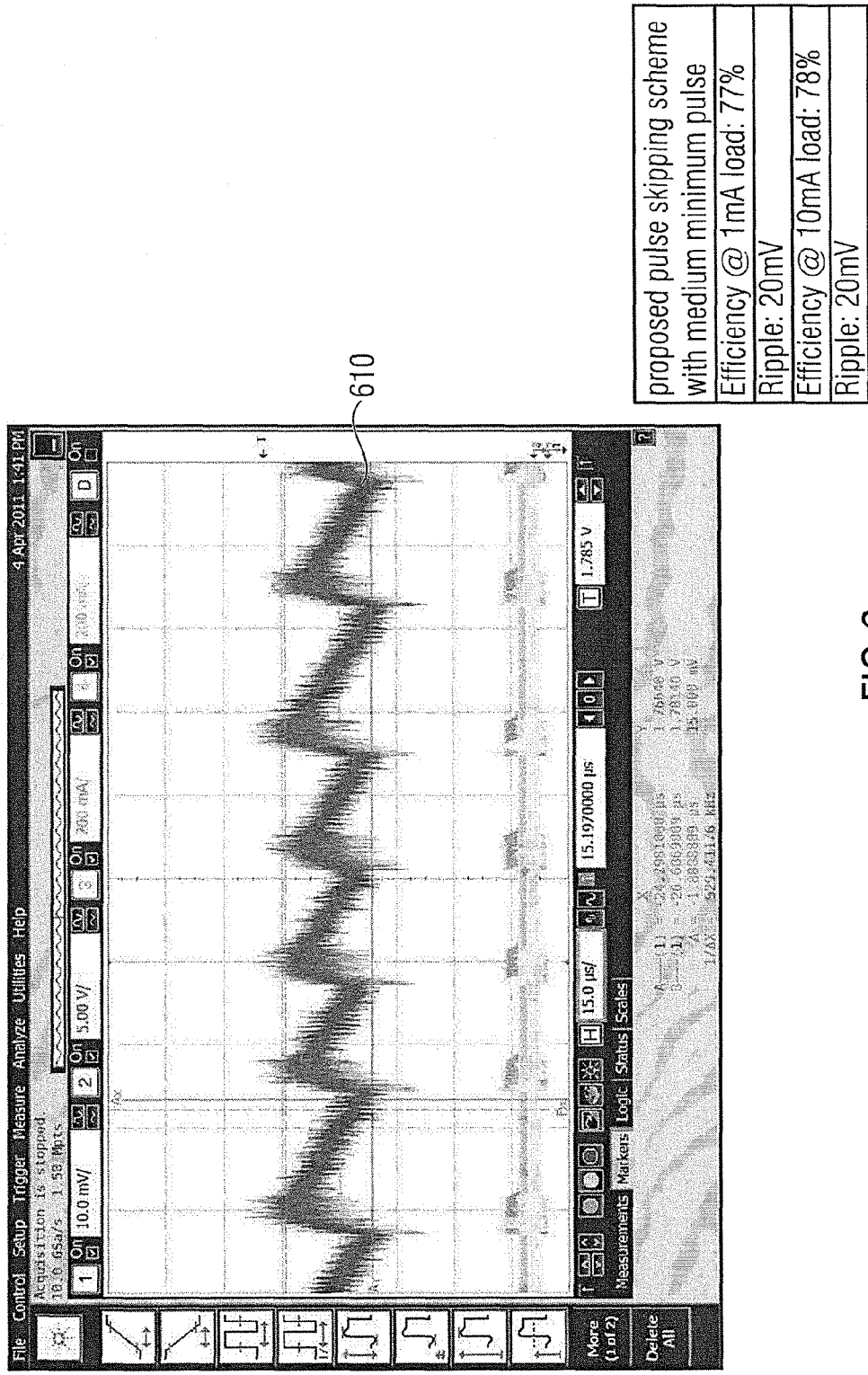
FIG. 6 shows a graphic representation of signals in a DC/DC converter using the proposed pulse skipping scheme with a medium minimum pulse, according to an embodiment of the invention.
Figure 7:
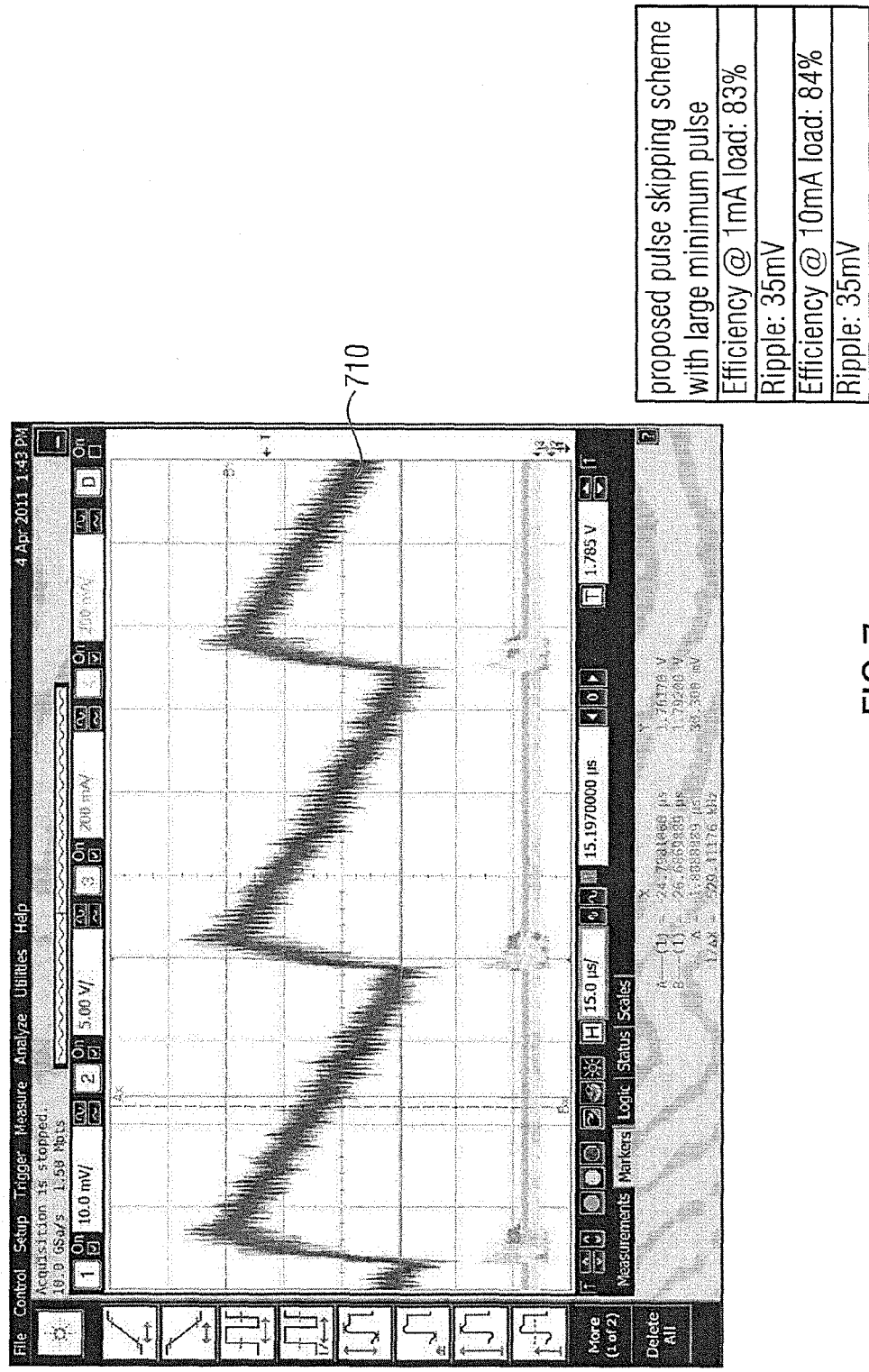
FIG. 7 shows a graphic representation of signals in a DC/DC converter using the proposed pulse skipping scheme with a large minimum pulse, according to an embodiment of the invention.

FIGS. 5, 6 and 7 show measurement results of the first implementation example (for example, the DC/DC converter according to FIG. 3).

FIG. 5 shows a graphic representation of signals in a conventional DC/DC converter. An abscissa describes the time and an ordinate describes signal levels. In particular, a curve 510 describes a temporal evolution of an output voltage of a switch mode converter. It has been found that an efficiency at 1 mA load is approximately 68%, and that a ripple is about 5 mV in this case. Moreover, it has been found that an efficiency at 10 mA load is approximately 70% and that a ripple with 10 mA load is approximately 5 mV.

FIG. 6 shows a graphical representation of signals in a DC/DC converter using the proposed pulse skipping scheme with a "medium minimum pulse". Here, the term "medium minimum pulse" refers to the minimum pulse that occurs after pulse skipping (not to the absolute minimum length pulse in the non-pulse-skipping mode), i.e., the "medium minimum pulse" corresponds to the second threshold duty cycle value. An abscissa describes the time, and an ordinate describes signal levels. In particular, a curve 610 describes a temporal evolution of an output voltage of the DC/DC converter. It has been found that an efficiency at 1 mA load is approximately 77%, wherein a ripple is approximately 20 mV. Moreover, it has been found that an efficiency at 10 mA load is approximately 78%, wherein a ripple is approximately 20 mV.

FIG. 7 shows a graphical representation of signals in a DC/DC converter using the proposed pulse skipping scheme with a large minimum pulse. An abscissa describes the time, and an ordinate describes signal levels. A curve 710 describes a temporal evolution of an output voltage of the DC/DC converter. It has been found that an efficiency at 1 mA load is approximately 83%, wherein a ripple is approximately 35 mV. Also, it has been found that an efficiency at 10 mA load is approximately 84%, wherein a ripple is approximately 35 mV.

To summarize, it can be said that measurement results of a test circuit have shown that the usage of the proposed pulse skipping scheme brings along a significant improvement in efficiency, wherein the ripple somewhat increases. However, it appears that the ripple is typically within a tolerable range.

To further conclude, it can be seen from FIGS. 5 to 7, that show measurement results of the first implementation example, that the efficiency is increased from 68% to 83% at 1 mA load current and from 70% to 84% at 10 mA load current. The screen shots of the oscilloscope, which are shown in FIGS. 5 to 7, show the resulting increase of voltage ripple at the output. The trade-off between ripple and efficiency can be seen by comparing FIGS. 6 and 7.

In the following, some further details regarding the operation of the DC/DC converters 300 and 400 will be given.

For this purpose, FIGS. 8a and 8b show graphical representations of signals that are present in the DC/DC converter 300 according to FIG. 3. FIG. 8b shows a time-zoomed representation of the signals of FIG. 8a.

A first graphical representation 810 describes a temporal evolution of an output voltage of the DC/DC converter, when an abscissa describes the time and an ordinate describes the value of the output voltage. A second graphical representation 820 describes current pulses of the switch mode converter 310, wherein a height of the pulses represents (at least approximately) a length (or duty cycle) of the pulses. A third representation 830 describes a temporal evolution of the threshold duty cycle information 364. A fourth graphical representation 840 shows a temporal evolution of the desired duty cycle information 332.

As can be seen, a pulse skipping is triggered, for example, at time t1, when it is found that the desired duty cycle information falls below a threshold duty cycle value of, for example, 16%. Accordingly, the threshold duty cycle value is increased, as a response, for example, to 40%. Accordingly, a pulse skipping is performed until it is found, by the drive signal generator, that the desired duty cycle value reaches or exceeds the threshold duty cycle value of 40%. This happens at time t2. Accordingly, the provision of pulses of the drive signal is resumed at time t2, and the threshold duty cycle value is again decreased down to 16%. Consequently, pulses of the drive signal are provided until time t3, when it is found by the drive signal generator that the desired duty cycle value again reaches or falls below said threshold duty cycle value of 16%.

FIG. 9a shows a schematic representation of signals of DC/DC converter 400 according to FIG. 4. A first graphical representation 910 shows a temporal evolution of an output voltage of the switch mode converter 410, when an abscissa describes the time and wherein an ordinate describes the value of the output voltage. A second graphical representation 920 describes current pulses of the switch mode converter 410, wherein it should be noted that an abscissa describes the time and an ordinate describes the value which is equal to 100% minus the desired duty cycle information 432. A third graphical representation 930 represents an increment value by which the desired duty cycle information 432 is incremented to obtain the modified duty cycle information 441. A fourth graphical representation 940 describes a temporal evolution of the desired duty cycle information.

As can be seen, a first pulse after a pulse skipping, for example, a pulse starting at time t1, or a pulse starting at time t2, or a pulse starting at time t3, is artificially prolonged when compared to the one or more following pulses. This artificial pulse prolongation (over the pulse length described by the desired duty cycle information) is caused by the provision of the duty cycle modification value 472, which is increased in response to the skipping of one or more pulses of the drive signal and consequently causes the modified duty cycle value to be larger than the desired duty cycle value Moreover, the duty cycle modification value is decreased in response to the provision of a first pulse of the drive signal following a pulse skipping, such that subsequent pulses (provided immediately after the first pulse following the pulse skipping, without any additional pulse skipping in between) are not prolonged (when compared to the pulse length described by the desired duty cycle information) or less prolonged (when compared to the pulse length described by the desired duty cycle information) than the first pulse following the pulse skipping. However, it is naturally possible that more than one pulse immediately following a pulse skipping are artificially prolonged.

Moreover, it should be noted that FIGS. 10a and 10b show implementation examples of the control mechanism of the DC/DC converters 300 and 400.

To further conclude, a DC/DC converter according to the invention may have a small minimum duty cycle during continuous conduction mode (CCM) and discontinuous conduction mode (DCM). Therewith, a very fast dynamic response is possible, as the controller (included in the converter) (for example, the drive signal generator 220, 420, or the controller 230, 430 thereof) can vary the duty cycle within wide limits. Moreover, a small output voltage can be generated from a large battery voltage (for example, using a "buck converter").

As soon as a single pulse is skipped, however, this minimum duty cycle is increased in an embodiment of the invention (for example, in the embodiment of FIG. 3). Increasing the minimum duty cycle means that it takes longer until a new pulse is issued, i.e., more pulses are skipped (when compared to conventional approaches). This increases the efficiency, as less switching events occur and leads to less dynamic losses.

If a pulse occurs (for example, a first pulse following a pulse skipping), however, it has a larger pulse width, thus transfers more charge to the output (for example, when compared to a minimum length pulse of the discontinuous conduction mode). One can say that one switching event transfers more charge to the output so less switching events are needed (when compared to a conventional concept in which the first pulse following a pulse skipping would not be extended in length or, equivalently, in duty cycle). As soon as one pulse is issued, the minimum duty cycle limit is reset again (for example, to the first threshold duty cycle value), i.e., now the controller can dynamically control the output voltage with the full duty cycle dynamics, until the next pulse skipping decision is taken. Details regarding this implementation are described, for example, in making reference to FIG. 3.

In an alternate implementation (for example, in the embodiment of FIG. 4), the minimum duty cycle limit relevant for the pulse skipping decision is constant. The switching pulse, however, that is generated when the converter has skipped (one or more) previous pulses is artificially increased, so the resulting charge is again larger than in a normal mode of operation (for example, when providing a minimum length pulse). If a pulse is issued (for example, in response to the provision of a first pulse after the pulse skipping), the duty cycle increment is disabled again, i.e., the converter has its normal control capability until the next decision for pulse skipping is taken. A block schematic diagram of such an embodiment is shown in FIG. 4.

FIG. 2 illustrates the operation of the proposed converter (for example, of the converter according to FIG. 1 or of the converter according to FIG. 3): There is no difference during continuous conduction mode (CCM) and discontinuous conduction mode (DCM) mode of operation (for example, when compared to a conventional DC/DC converter, wherein a transition from the pulse skipping mode to the discontinuous conduction mode or continuous conduction mode is not considered). In the discontinuous conduction mode, the duty cycle is decreased with decreasing load current until a certain minimum value occurs (for example, a minimum value of the desired duty cycle information). If the load current is reduced further (which may be recognized by a further decrease of the desired duty cycle information), pulses are skipped. It can be seen that as soon as a pulse is skipped, the minimum duty cycle (for example, described by the threshold duty cycle information) is increased. The next pulse which is not skipped is thus larger (for example, when compared to the minimum length pulse of the discontinuous conduction mode). As soon as a pulse occurs, the minimum duty cycle (for example, described by the threshold duty cycle information) is reset to its original value (for example, the first threshold duty cycle value).

The effect of the proposed pulse skipping technique described above is an increased efficiency at low load currents (wherein reference measurement results have been discussed above making reference to FIGS. 5, 6 and 7).

A side effect is the increased voltage ripple caused by less but larger switching pulses: The larger minimum duty cycle limit in pulse skipping mode means that the voltage error must typically (but not necessarily) become larger before a pulse is issued. This pulse then has a larger pulse width leading to a stronger increase of the output voltage. The voltage ripple can be controlled by choosing the minimum duty cycle during pulse skipping mode, i.e., can be traded against efficiency. As the increased ripple occurs only for very low load currents, any interference with radios is very unlikely. An advantage of the proposed technique is that the same controller is used for all modes of operation. No control loop needs to be broken up dynamically and replaced by another one. This keeps the design of the controller simple and guarantees reliable operation.

To further conclude, the core of some embodiments of the invention is a synchronous DC/DC converter comprising at least two modes of operation (where one mode is a pulse skipping mode), generating switching pulses with a first minimum pulse width in a first mode of operation, and generating switching pulses with a second minimum pulse width in a second mode of operation.

In one embodiment of the DC/DC converter, the first mode of operation is a continuous conduction mode (CCM) or discontinuous conduction mode (DCM), characterized by the fact that a switching pulse occurs in each switching cycle. The second mode of operation is a pulse skipping mode characterized by the feature that preceding to each switching pulse at least one pulse is missing, i.e., skipped.

In one embodiment of the DC/DC converter, switching between two modes of operation is done automatically if the intended duty cycle (also designated as desired duty cycle) is smaller or larger, respectively, than the respective minimum duty cycle of the operation mode.

In one embodiment of the DC/DC converter, the intended duty cycle (also designated as desired duty cycle) is incremented by the increment value if the converter is in the pulse skipping mode (or has been in the pulse skipping mode immediately before the provision of the current pulse). Optionally, the increment value may be programmable, and/or the increment value may be dependent on a skip rate.

In one embodiment of the DC/DC converter may comprise a digital control loop.

In the following, some further background information will be given to facilitate the understanding of the performance improvement that can be obtained using embodiments according to the invention.

Generally speaking, switched mode voltage converters are used to transfer an input voltage from an input level Vin to an output voltage with a different level Vout. The output voltage Vout may be smaller or larger than the input voltage Vin and/or may have a different sign. The efficiency of the converter describes the fraction of the power losses and is defined by efficiency=output power/input power=output power/
(output power+power losses).

For large output currents, the efficiency is usually determined by the parasitic on-resistance of the power switches. For low-load currents, efficiency is determined by the dynamic losses for turning the power switches on and off. The energy loss per switching event does not scale with the load current. Hence; the efficiency drops quickly with a decreasing load current. Embodiments according to the invention improve the efficiency of a switched mode voltage converter under light load conditions.

Figure 11:
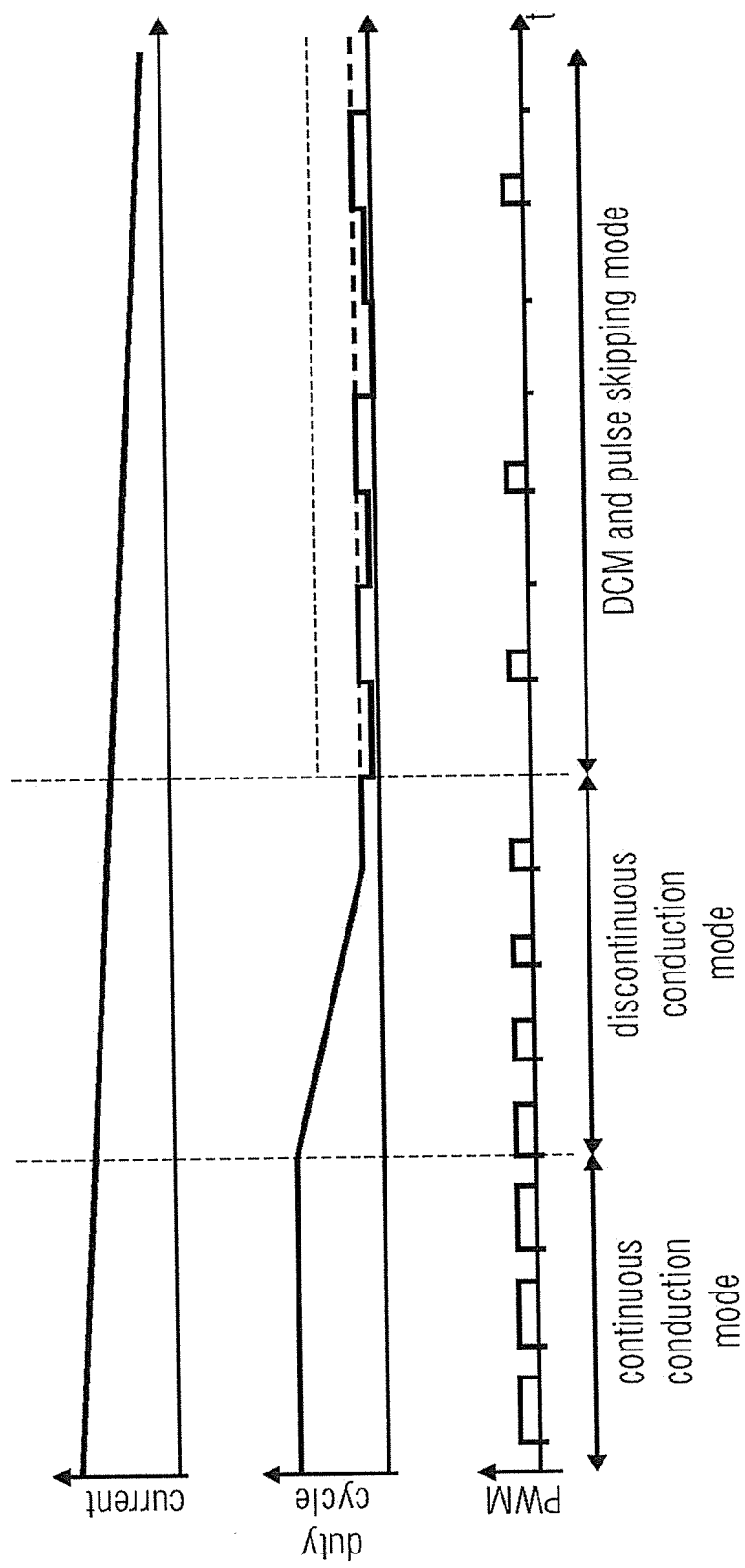
FIG. 11 shows a schematic representation of a conventional operation of a DC/DC converter with pulse skipping at low load currents.

FIG. 11 shows the operation of a conventional switched mode converter (DC/DC converter) exemplarily for a buck converter: For large currents the duty cycle of the control signal which is used to turn the power switches on and off is constant, i.e., not or only slightly load dependent (continuous conduction mode). For medium currents, the duty cycle decreases with the load current (discontinuous conduction mode) until it reaches a minimum duty cycle. The minimum duty cycle is implementation specific and depends on the speed of the output driver. When the current is decreased further, the converter starts to skip complete pulses (pulse skipping mode). This is required to avoid an increase of the output voltage. The charge transferred to the output by a single pulse with minimum pulse width is given by the following equation, which holds for a buck converter:

$$Q=(VB-Vo)/(2L) \times VB/Vo \times T\min^2,$$

wherein VB describes a battery voltage (or input voltage), wherein Vo describes an output voltage, wherein L describes a coil inductance, and wherein Tmin describes a duration of a minimum pulse.

It can be seen that with decreasing minimum pulse width, the charge goes down quadratically. This means that with increasing switching frequency of the converter (leading to a smaller minimum pulse width) more pulses are needed, i.e., less pulses are skipped, which leads to worse efficiency. This becomes clear by considering the dynamic power Pdyn for turning the power switches on and off:

$$P\text{dyn}=i\text{load} \times \text{energy\_for\_one\_switching\_event}/Q.$$

Implications of the above consideration are as follows:
strongly decreasing efficiency with increasing switching frequency; and
large dynamic losses for large coils at low load conditions, which results in weak efficiency;
(at high load conditions this is the other way around)

A conventional approach to keep efficiency high even at higher switching frequency is to keep the minimum pulse width high. However, this limits the dynamics during transient response at the converter as well as the conversion ratio. Usually, these requirements mean that the minimum duty cycle cannot be kept high, i.e., efficiency at low load currents is indeed worse. However, it has been found that high switching frequency is desirable anyhow to enable a fast dynamic response, low ripple and smaller (=cheaper) passive components (i.e., coil and capacitance).

Figure 12:
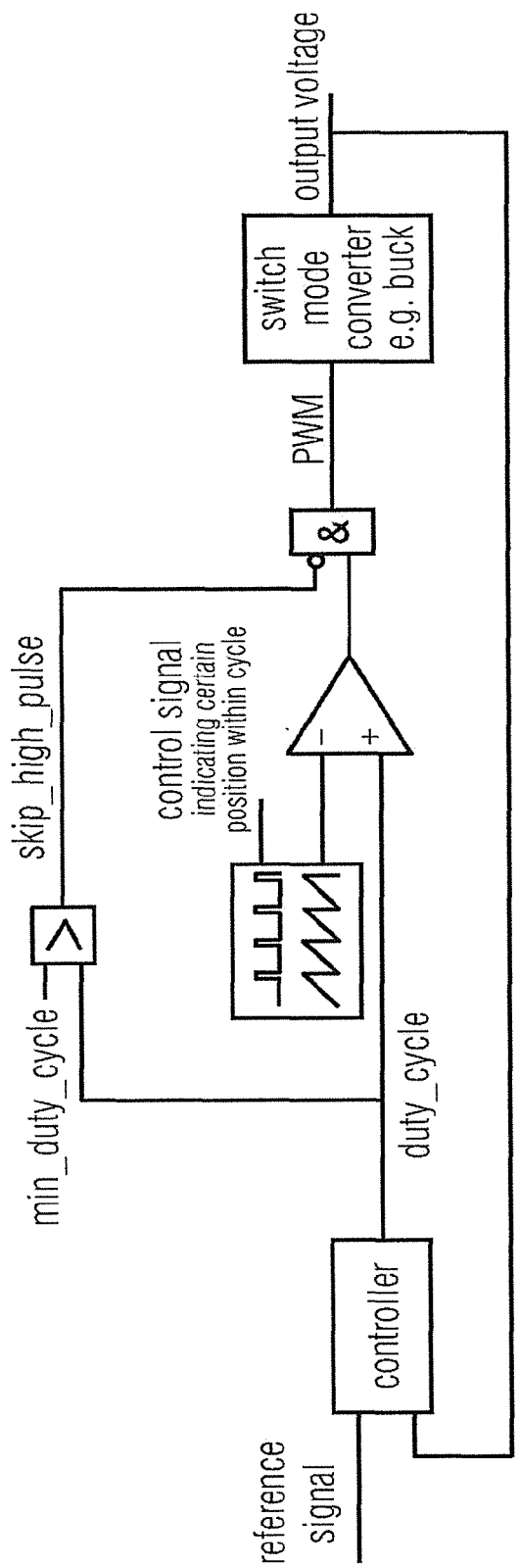
FIG. 12 shows a block schematic representation of a DC/DC converter with a conventional pulse skipping mechanism.

FIG. 12 shows a block schematic diagram of a conventional DC/DC converter with pulse skipping for comparison purposes.

To further conclude, it should be noted that the operation of a DC/DC converter according to an embodiment of the invention can be seen by measuring the switching node of the converter externally. In some embodiments, the switching node is the pin of the converter connected to an external coil. In some embodiments, at this node the pulses can be monitored directly. If the converter uses the proposed concept there is a minimum pulse width during high current or transient operation that is smaller than the minimum pulse width that occurs during pulse skipping mode.

It should also be noted that the embodiments according to the invention can be used in stand-alone power supplies. Moreover, embodiments according to the invention can be used in integrated power supply for systems on a chip (SOCs).

Moreover, it should be noted that an alternative solution would be a DC/DC converter that switches automatically from pulse width modulation mode of operation to PFM mode of operation when the load current is small. This, however, introduces additional latency that makes the transient response worse. As the proposed concept, according to some embodiments of the invention, is enabled and disabled from one switching cycle to the next one, it becomes effective immediately, i.e., it improves efficiency even if the low load phases are quite small.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A DC/DC converter, comprising:
   a switch mode converter configured to provide an output voltage based on an input voltage; and
   a drive signal generator configured to provide a drive signal for the switch mode converter,
   wherein the drive signal generator is configured to switch between a non-pulse-skipping mode and a pulse-skipping mode,
   wherein the drive signal generator is configured to adapt a setting of a pulse generation such that a length of a first pulse following a pulse skipping in the pulse-skipping mode is larger than a minimum length of a pulse in the non-pulse-skipping mode,
   wherein upon occurrence of an immediately subsequent pulse in the next switching cycle after the first pulse, a length of the immediately subsequent pulse is less than the length of the first pulse, and
   wherein the drive signal generator is configured to selectively omit provision of a pulse of the drive signal if a desired duty cycle information is smaller than or equal to a first threshold duty cycle value represented by a first threshold duty cycle information, and increase in a stepwise fashion the desired duty cycle information from a value below the first threshold duty cycle value to a value above a second threshold duty cycle value in response to an omission of provision of a pulse of the drive signal, such that a length of the first pulse following the pulse skipping is larger than the minimum length of the pulse in the non-pulse-skipping mode.

2. The DC/DC converter according to claim 1, wherein the DC/DC converter is a synchronous DC/DC converter,
   wherein the DC/DC converter comprises a timing generator configured to define a sequence of switching cycles,
   wherein the drive signal generator is configured to provide a pulse of the drive signal for each switching cycle in the non-pulse-skipping mode, and
   wherein the drive signal generator is configured to omit a provision of a pulse of the drive signal in one or more switching cycles in the pulse-skipping mode, to thereby perform a pulse skipping.

3. The DC/DC converter according to claim 2, wherein the drive signal generator is configured to adjust a duty cycle of pulses of the drive signal in the non-pulse-skipping mode based on a comparison or difference formation between the output voltage and a reference voltage, such that the minimum length of a pulse is obeyed.

4. The DC/DC converter according to claim 3, wherein the drive signal generator is configured to obtain the desired duty cycle information based on the comparison or difference formation between the output voltage and the reference voltage both in the pulse-skipping mode and in the non-pulse-skipping mode, and wherein the drive signal generator is configured to compare the desired duty cycle information with the first threshold duty cycle information, and to switch from the non-pulse-skipping mode to the pulse-skipping mode if the desired duty cycle information is smaller than or equal to the first threshold duty cycle value represented by the first threshold duty cycle information.

5. The DC/DC converter according to claim 4, wherein the DC/DC converter is configured to operate in a continuous conduction mode without pulse skipping, in a discontinuous conduction mode without pulse skipping and in the pulse-skipping mode, and wherein the drive signal generator is configured to selectively omit provision of a pulse of the drive signal if the desired duty cycle information is smaller than or equal to the first threshold duty cycle value, and wherein the drive signal generator is configured to increase in a step-wise fashion the desired duty cycle information from a value below the first threshold duty cycle value to a value above a second threshold duty cycle value in response to the omission of provision of a pulse of the drive signal if the DC/DC converter was operating in the continuous conduction mode immediately before the omission of the provision of a pulse of the drive signal, and wherein the drive signal generator is configured to leave the desired duty cycle information unchanged if the DC/DC converter was operating in the discontinuous conduction mode immediately before the omission of the provision of a pulse of the drive signal, such that the length of the first pulse following the pulse skipping is larger than the minimum length of the pulse in the non-pulse-skipping mode, if the DC/DC converter was operating in the continuous conduction mode immediately before the omission of the provision of a pulse of the drive signal.

6. The DC/DC converter according to claim 1, wherein the drive signal generator is configured to resume provision of one or more pulses of the drive signal after the omission of one or more pulses of the drive signal if the desired duty cycle information is larger than or equal to the second threshold duty cycle value, and wherein the drive signal generator is configured to reduce the desired duty cycle information in response to the resumption of the provision of one or more pulses of the drive signal.

7. The DC/DC converter according to claim 6, wherein the drive signal generator is configured to reset the desired duty cycle information to a value below the first threshold duty cycle value in response to the resumption of provision of one or more pulses of the drive signal.

8. The DC/DC converter according to claim 1, wherein the drive signal generator is configured to obtain the desired duty cycle information, and wherein the drive signal generator is configured to switch from the non-pulse-skipping mode to the pulse-skipping mode if the desired duty cycle information is smaller than or equal to the first threshold duty cycle value, and wherein the drive signal generator is configured to switch from the pulse-skipping mode to the non-pulse-skipping mode if the desired duty cycle information is larger than or equal to the second threshold duty cycle value, wherein the first threshold duty cycle value is different from the second threshold duty cycle value.

9. The DC/DC converter according to claim 1, wherein the drive signal generator is configured to obtain the desired duty cycle information, and wherein the drive signal generator is configured to provide pulses of the drive signal in the non-pulse-skipping mode if the desired duty cycle information is larger than or equal to the first threshold duty cycle value, and wherein the drive signal generator is configured to enter the pulse-skipping mode, in which provision of one or more pulses of the drive signal is omitted, in response to the desired duty cycle information reaching or falling below the first threshold duty cycle value, and wherein the drive signal generator is configured to resume provision of one or more pulses of the drive signal after the omission of one or more pulses only when the desired duty cycle information reaches or exceeds the second threshold duty cycle value, wherein the second threshold duty cycle value is larger than the first threshold duty cycle value.

10. The DC/DC converter according to claim 9, wherein the drive signal generator is configured to provide the pulses of the drive signal such that a duty cycle of the pulses of the drive signal is determined by the desired duty cycle information, such that a length of a pulse following a pulse skipping is larger than a minimum length of a pulse, wherein the minimum length of a pulse is determined by the first threshold duty cycle value.

11. The DC/DC converter according to claim 1, wherein the non-pulse-skipping mode is a continuous conduction mode or a discontinuous conduction mode.

12. The DC/DC converter according to claim 1, wherein the DC/DC converter comprises a digital control loop.

13. The DC/DC converter of claim 1, wherein the drive signal generator is configured to adapt a duty cycle of a pulse generation during the non-pulse-skipping mode that is a function of a load current at an output of the DC/DC converter.

14. The DC/DC converter of claim 1, further comprising:
a controller configured to alter the desired duty cycle information based on the output voltage,
wherein the desired duty cycle information is increased in a step-wise fashion if the desired duty cycle information is smaller than or equal to the first threshold duty cycle value represented by the first threshold duty cycle information, and
wherein the desired duty cycle information is decreased in a step-wise fashion if the desired duty cycle information is larger than or equal to the second threshold cycle value represented by a second threshold duty cycle information.

15. A DC/DC converter, comprising:
means for providing an output voltage based on an input voltage; and
means for providing a drive signal for the means for providing the output voltage,
wherein the means for providing the drive signal is configured to switch between a non-pulse-skipping mode and a pulse-skipping mode,
wherein the means for providing the drive signal is configured to adapt a setting of a pulse generation such that a length of a first pulse following a pulse skipping in the pulse-skipping mode is larger than a minimum length of a pulse in the non-pulse-skipping mode,
wherein the means for providing the drive signal is further configured to adapt a setting of the pulse generation such that upon occurrence of an immediately subsequent pulse in the next switching cycle after the first pulse, a length of the immediately subsequent pulse is less than the length of the first pulse, and
wherein the means for providing the drive signal is further configured to selectively omit provision of a pulse of the drive signal if a desired duty cycle information is smaller than or equal to a first threshold duty cycle value represented by a first threshold duty cycle information, and increase in a step-wise fashion the desired duty cycle information from a value below the first threshold duty cycle value to a value above a second threshold duty cycle value in response to the omission of provision of a pulse of the drive signal, such that a length of the first pulse following the pulse skipping is larger than the minimum length of the pulse in the non-pulse-skipping mode.

16. The DC/DC converter of claim 15, wherein the means for providing the drive signal is configured to adapt a duty cycle of a pulse generation during the non-pulse-skipping mode that is a function of a load current at an output of the DC/DC converter.

17. A DC/DC converter, comprising:
a switch mode converter configured to provide an output voltage based on an input voltage; and
a drive signal generator configured to provide a drive signal for the switch mode converter,
wherein the drive signal generator is configured to switch between a non-pulse-skipping mode and a pulse-skipping mode,
wherein the drive signal generator is configured to adapt a setting of a pulse generation such that a length of a first pulse following a pulse skipping mode is larger than a minimum length of a pulse in the non-pulse-skipping mode;
wherein the DC/DC converter is a synchronous DC/DC converter,
wherein the DC/DC converter comprises a timing generator configured to define a sequence of switching cycles,
wherein the drive signal generator is configured to provide a pulse of the drive signal for each switching cycle in the non-pulse-skipping mode, and
wherein the drive signal generator is configured to omit provision of a pulse of the drive signal in one or more switching cycles in the pulse-skipping mode, to thereby perform a pulse skipping;
wherein the drive signal generator is configured to adjust a duty cycle of the pulses of the drive signal in the non-pulse-skipping mode based on a comparison or difference formation between the output voltage and a reference voltage, such that the minimum length of a pulse is obeyed;
wherein the drive signal generator is configured to obtain a desired duty cycle information based on the comparison or difference formation between the output voltage and the reference voltage both in the pulse-skipping mode and in the non-pulse-skipping mode;
wherein the drive signal generator is configured to compare the desired duty cycle information with a first fixed threshold duty cycle value, and to switch from the non-pulse-skipping mode to the pulse-skipping mode if the desired duty cycle information is smaller than or equal to the first fixed threshold duty cycle value;
wherein the drive signal generator is configured to selectively omit provision of a pulse of the drive signal if the desired duty cycle information is smaller than or equal to the first fixed threshold duty cycle value, and increase in a step-wise fashion the desired duty cycle information from a value below the first fixed threshold duty cycle value to a value above a second fixed threshold duty cycle value in response to the omission of provision of a pulse of the drive signal, such that a length of a first pulse following the pulse skipping in the pulse-skipping mode is larger than the minimum length of a pulse in the non-pulse-skipping mode, and
wherein upon occurrence of an immediately subsequent pulse in the next switching cycle after the first pulse, a length of the immediately subsequent pulse is less than the length of the first pulse.

18. The DC/DC converter of claim 17, wherein the drive signal generator is configured to adapt a duty cycle of a pulse generation during the non-pulse-skipping mode that is a function of a load current at an output of the DC/DC converter.

19. A method for providing an output voltage based on an input voltage using a switch mode converter, the method comprising:
providing a drive signal for a switch mode converter; and
switching a switch of the switch mode converter based on the drive signal to provide the output voltage based on the input voltage,
wherein providing the drive signal comprises providing the drive signal in a non-pulse-skipping mode and providing the drive signal in a pulse-skipping mode;
wherein a switching is performed between the non-pulse-skipping mode and the pulse-skipping mode;
wherein a setting of a pulse generation of the drive signal is adapted such that a length of a first pulse following a pulse skipping in the pulse-skipping mode is larger than a minimum length of a pulse in the non-pulse-skipping mode,
wherein the setting of the pulse generation of the drive signal is further adapted such that upon occurrence of an immediately subsequent pulse in the next switching cycle after the first pulse, a length of the immediately subsequent pulse is less than the length of the first pulse, and
wherein a desired duty cycle information is increased in a step-wise fashion from a value below a first fixed threshold duty cycle value to a value above a second fixed threshold duty cycle value in response to the omission of the provision of the pulse of the drive signal, such that a provision of one or more pulses of the drive signal is only resumed after the omission of the provision of one or more pulses of the drive signal when the desired duty cycle information reaches or exceeds the second fixed threshold duty cycle value.

20. The method according to claim 19, wherein the method further comprises providing the desired duty cycle information to regulate a length of pulses of the drive signal based on a load condition in the non-pulse-skipping mode, wherein the desired duty cycle information is compared with the first threshold duty cycle value, and wherein a provision of a pulse of the drive signal is omitted if it is found that the desired duty cycle information is smaller than or equal to the first threshold duty cycle value, such that a pulse skipping is performed.

21. The method according to claim 19, further comprising adapting the setting of the pulse generation such that the first pulse following a pulse skipping results in a transfer of a larger quantity of charge to an output capacitor than a minimum length pulse of the non-pulse-skipping mode.

22. The method of claim 19, wherein providing the drive signal further comprises adapting a duty cycle of a pulse generation during the non-pulse-skipping mode that is a function of a load current at an output of the switch mode converter.

* * * * *